US011278073B2

(12) United States Patent
Yarger

(10) Patent No.: US 11,278,073 B2
(45) Date of Patent: Mar. 22, 2022

(54) MAGNETIC FASTENER

(71) Applicant: MAGNAHALTER LLC, Elmore, OH (US)

(72) Inventor: Sara Marie Yarger, Elmore, OH (US)

(73) Assignee: MAGNAHALTER LLC, Elmore, OH (US)

( * ) Notice: Subject to any disclaimer, the term of this patent is extended or adjusted under 35 U.S.C. 154(b) by 0 days.

(21) Appl. No.: 16/908,915

(22) Filed: Jun. 23, 2020

(65) Prior Publication Data

US 2020/0315274 A1 Oct. 8, 2020

Related U.S. Application Data

(63) Continuation-in-part of application No. 16/282,664, filed on Feb. 22, 2019, now abandoned.

(60) Provisional application No. 62/736,199, filed on Sep. 25, 2018, provisional application No. 62/641,263, filed on Mar. 9, 2018, provisional application No. 62/635,894, filed on Feb. 27, 2018.

(51) Int. Cl.
*A41F 1/00* (2006.01)
*F16B 1/00* (2006.01)

(52) U.S. Cl.
CPC ............... *A41F 1/002* (2013.01); *F16B 1/00* (2013.01); *F16B 2001/0035* (2013.01)

(58) Field of Classification Search
CPC .... A41F 1/002; F16B 1/00; F16B 2001/0035; Y10T 24/32
See application file for complete search history.

(56) References Cited

U.S. PATENT DOCUMENTS

| | | | | |
|---|---|---|---|---|
| 2,615,227 A | * | 10/1952 | Hornik | A44C 5/2071 24/303 |
| 2,648,884 A | * | 8/1953 | Loofboro | A44C 5/2071 24/303 |
| 2,959,832 A | * | 11/1960 | Baermann | E05C 19/161 24/303 |
| 3,293,714 A | * | 12/1966 | Shafer | A44B 11/2596 24/303 |
| 5,664,298 A | * | 9/1997 | Nessar-Lvanovic | A44C 5/2071 24/303 |
| 6,163,938 A | * | 12/2000 | Weber-Unger | A41F 1/002 24/303 |
| 8,464,403 B2 | * | 6/2013 | Fiedler | H01F 7/0263 24/303 |

(Continued)

*Primary Examiner* — Jack W Lavinder
(74) *Attorney, Agent, or Firm* — Shumaker, Loop & Kendrick, LLP; James D. Miller

(57) ABSTRACT

A magnetic fastener includes a female component and a male component. The female component includes a base, a hooded portion spaced from the base and formed opposite thereto, and a peripheral wall connecting the base to the hooded portion. A pocket is formed between the base and the hooded portion. The hooded portion includes a slot formed therein. A portion of the female component is magnetically attractive. The male component includes an insertion portion and a shaft extending from the insertion portion. A portion of the male component is formed by a magnet. The male component is configured to be coupled to the female component when the magnet is magnetically coupled to the portion of the female component that is magnetically attractive, the insertion portion is received within the pocket, and the shaft is received within the slot.

17 Claims, 11 Drawing Sheets

(56) References Cited

U.S. PATENT DOCUMENTS

| | | | |
|---|---|---|---|
| 10,111,500 B2 * | 10/2018 | Lambert | A44B 11/28 |
| 10,212,993 B2 * | 2/2019 | Fiedler | A44B 11/2588 |
| 10,617,179 B2 * | 4/2020 | Fiedler | A44B 11/12 |
| 2004/0107547 A1 * | 6/2004 | Chung | A44B 11/2584 24/303 |
| 2007/0113383 A1 | 5/2007 | Grunberger et al. | |
| 2016/0286294 A1 * | 9/2016 | Schreiber | F16M 13/02 |
| 2020/0126456 A1 * | 4/2020 | Davison | F16B 11/006 |

* cited by examiner

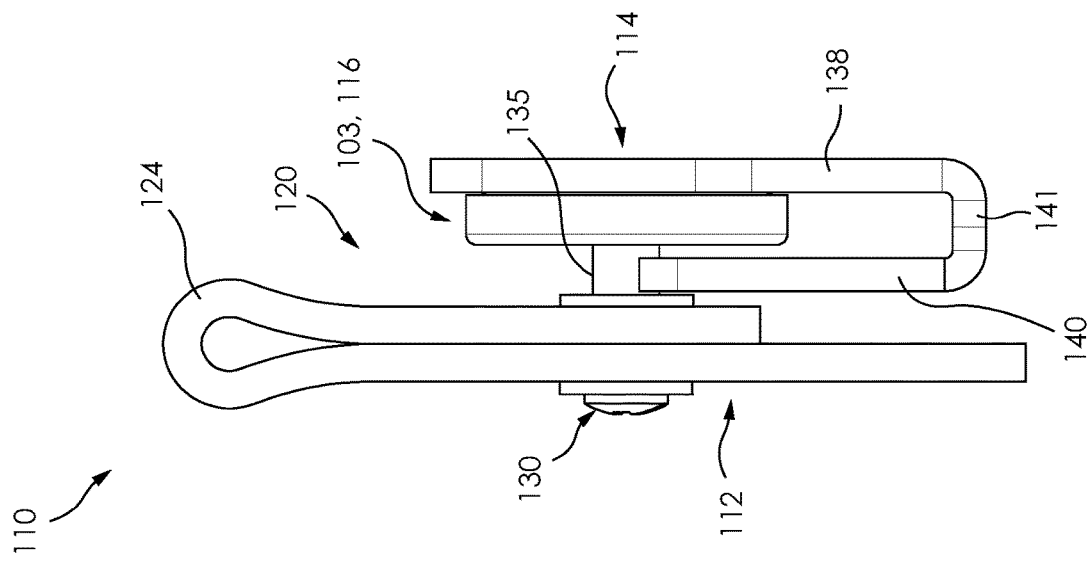
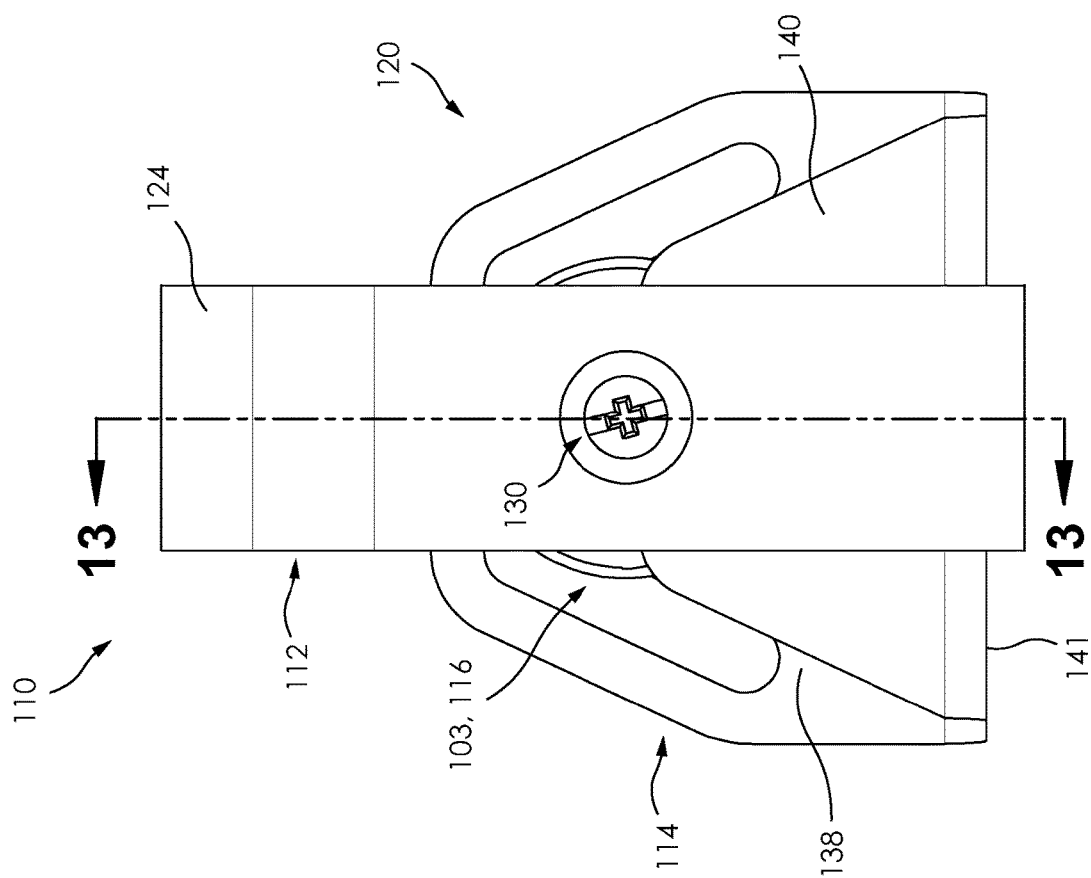

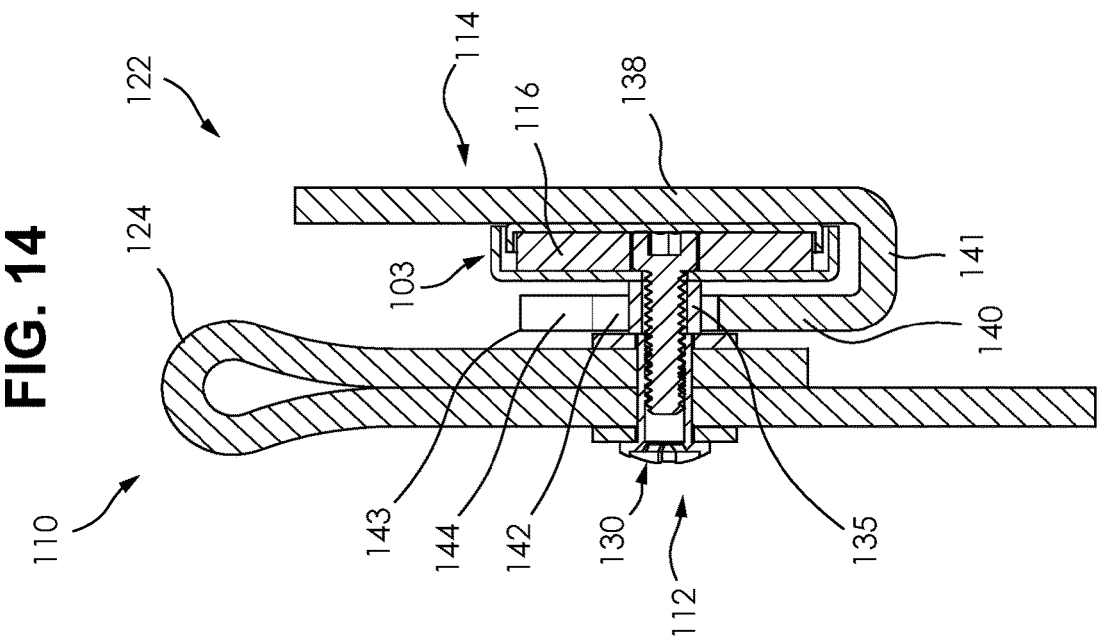
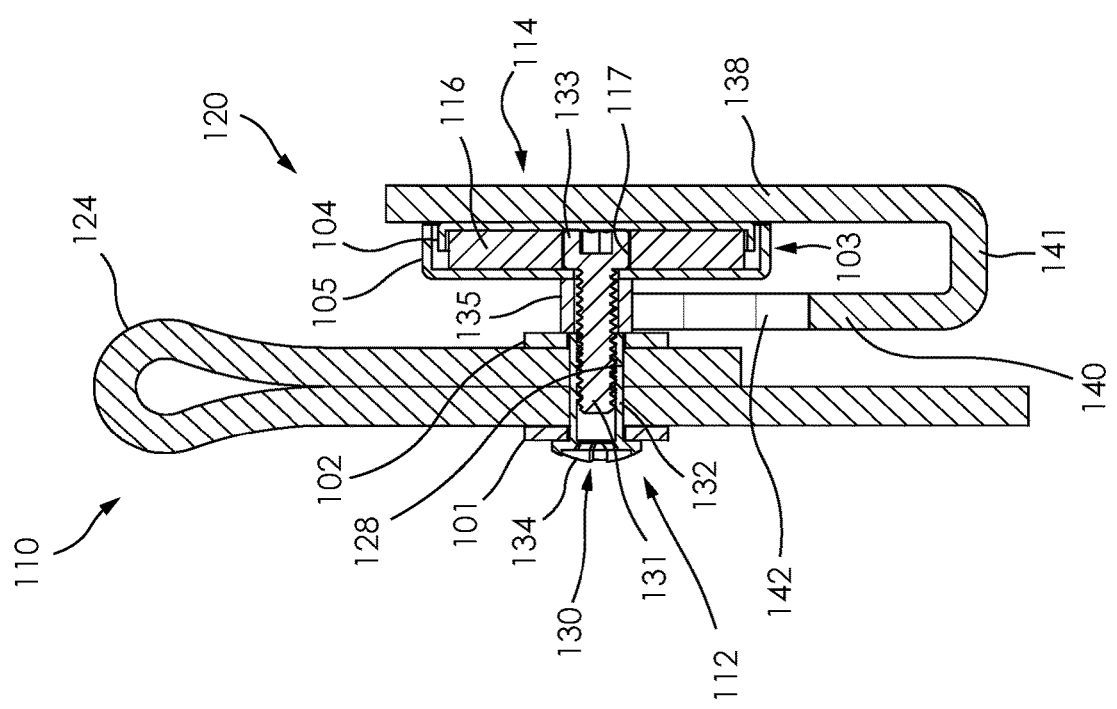

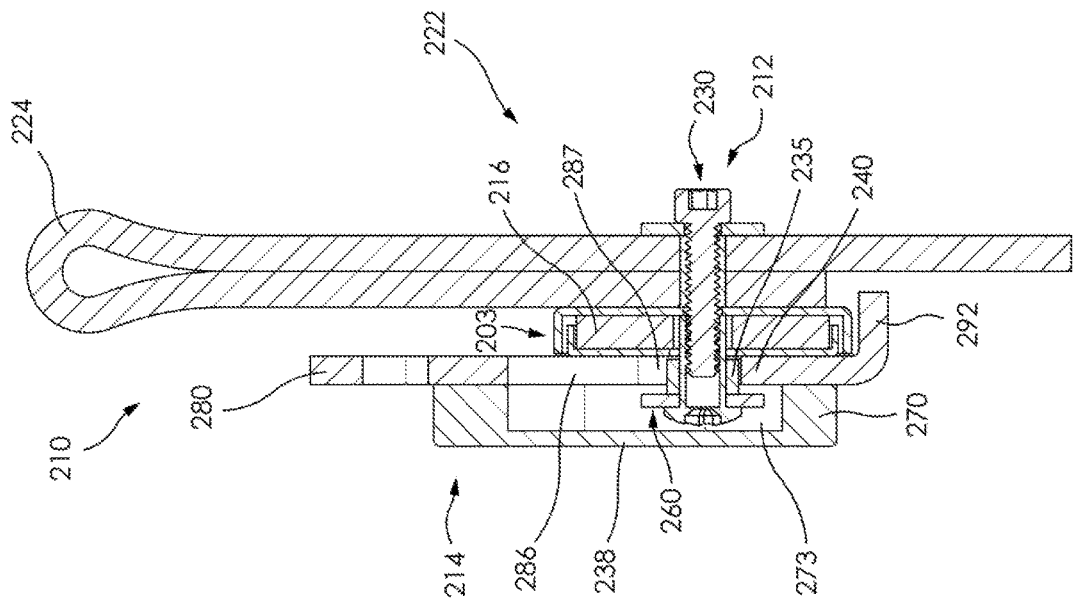

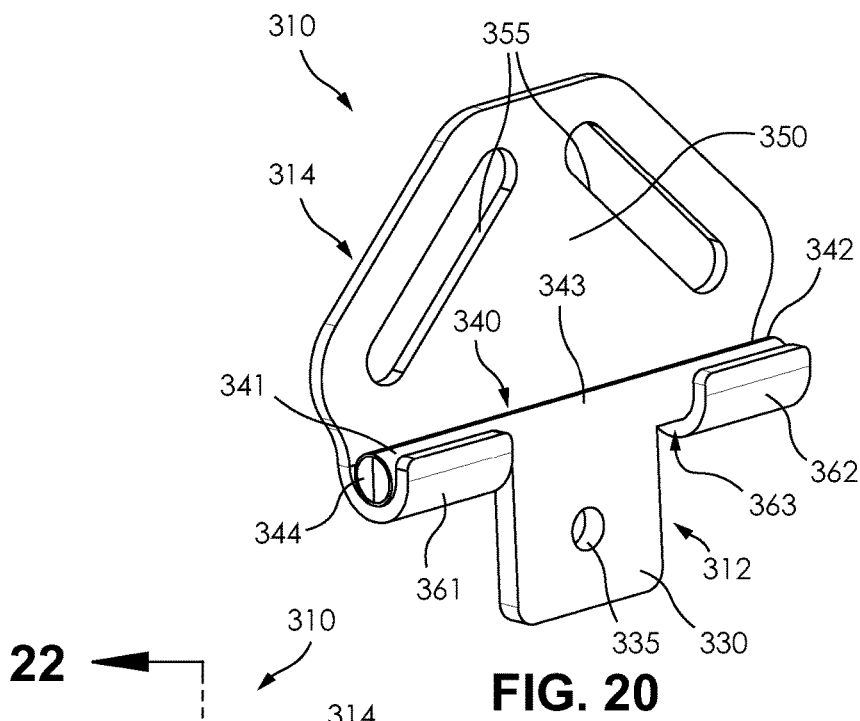
FIG. 20
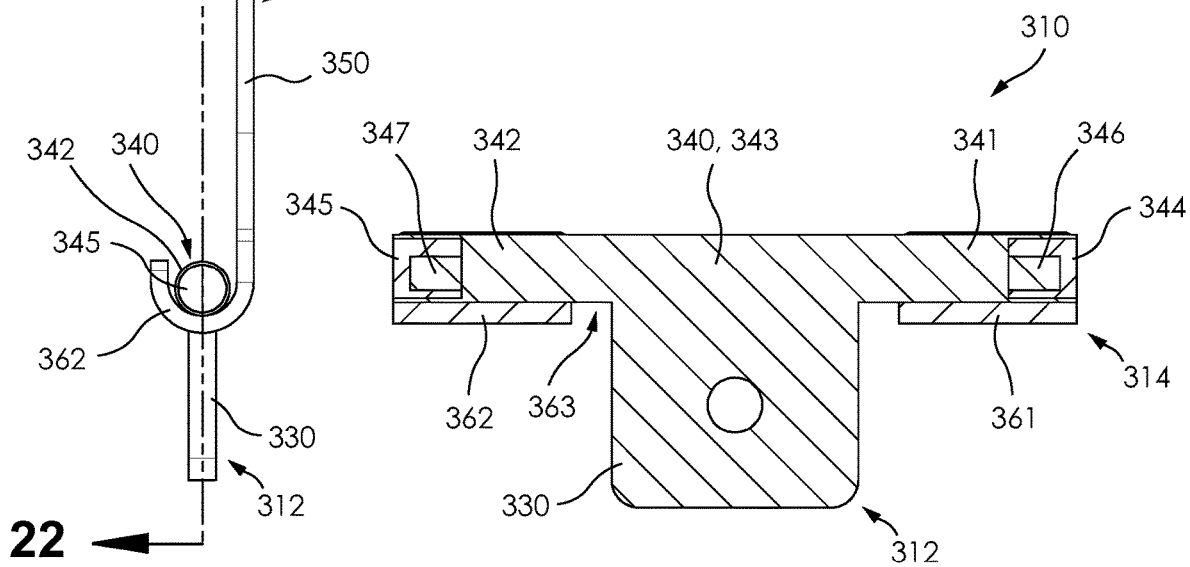
FIG. 21
FIG. 22

MAGNETIC FASTENER

CROSS-REFERENCE TO RELATED PATENT APPLICATIONS

This patent application is a continuation-in-part of U.S. patent application Ser. No. 16/282,664 filed on Feb. 22, 2019, which in turn claims the benefit of U.S. Provisional Patent Application Ser. No. 62/635,894, filed on Feb. 27, 2018, U.S. Provisional Patent Application Ser. No. 62/641,263, filed Mar. 9, 2018, and U.S. Provisional Patent Application Ser. No. 62/736,199, filed Sep. 25, 2018. The entire disclosures of the above patent applications are hereby incorporated herein by reference.

FIELD OF THE INVENTION

The present invention relates to a fastener. In particular, the invention is directed to a universally applicable magnetic fastener that implements a locking mechanism in order to maintain the fastener in a coupled position.

BACKGROUND OF THE INVENTION

Conventional fastener assemblies, such as straps, belts, bands and the like are commonly utilized to secure composite structures that require the assisted manual attachment of a male component to a female component. Generally, conventional fasteners impose a cumbersome dilemma upon a user, especially when utilized in such a specific way as in a horse halter or pet collar, for example. This is due to many factors that are prevalent whilst installing a fastener in such a way, like unpredictability of an animal's behavior and the wide surface area the fastener can potentially span that make the fastener difficult to couple and uncouple.

Magnetic fasteners have presented a widely used solution to the issues that are ubiquitously attributed to conventional fasteners. The convenience magnetic fasteners provide a user is perhaps the biggest reason magnetic fasteners have become a common replacement for conventional fasteners. Magnetic fasteners are usually constructed from a male component and a female component, each paired with complimentary magnets. Due to the nature of magnets, once a first component is within close proximity to the other component, the mutually attractive magnetic forces urge the two respective components together. When magnets are installed within a fastener system, this natural phenomenon aids in closing the fastener.

However, due to the characteristics of the inherent nature of magnetic attraction, it is understood that the magnetic coupling forces are generally strongest in the direction that is substantially normal, or perpendicular, to the coupling surfaces. In comparison, the mutual lateral attraction is relatively weak, and lateral dislocation of the magnetic components may occur relatively easily by lateral pulling of the magnetic components, which may cause inadvertent disengagement of the magnetic components when a lateral tension is applied. Many alternatives have been offered as ways to retard undesirable lateral movement. For example, frictional coupling surfaces or minimally apparent protrusions extending from the housing holding the magnets have been used. However, these options either conflict with the ease of self-alignment between the coupling surfaces or are not effective enough and are, therefore, not attractive options.

Further, magnets also have differing poles of attraction as part of a magnetic field, commonly known as a magnet's north and south poles. In effect, complimentary magnets naturally attract one another, but when like-poles are positioned to face one another these magnets repel one another.

Thus, it is desirable to provide a magnetic fastener that has a male component and a female component, each paired with a respectively complimentary magnet that may be universally applied to act as a fastener. It is also desirable to integrally formulate the female component with an apertured area that is purposed to receive the male component to militate against the inadvertent disengagement of the magnetic components.

SUMMARY OF THE INVENTION

In concordance and agreement with the instant disclosure, a new magnetic fastener that provides an easy mechanism to fasten individual components to one another while militating against the inadvertent disengagement of the magnetic components, has surprisingly been discovered.

According to an embodiment of the invention, this new magnetic fastener comprises a male component and a female component, each paired with a complimentary magnet predisposed to mutually attract one another when placed within proximal distance from each other. The female component of the magnetic fastener is constructed to accommodate an apertured area purposed to accept the male component of the magnetic fastener in order to prevent inadvertent disengagement of the two components in either the lateral or perpendicular directions once each respective component are fully engaged. In consideration of what is disclosed within the present invention, two variations of an embodiment are shown in regards to the female component to demonstrate the universal applications of this novel innovation.

According to another embodiment of the invention, this new magnetic fastener includes a female component and a male component. The female component includes a base, a hooded portion spaced from the base and formed opposite thereto, and a peripheral wall connecting the base to the hooded portion. A pocket is formed between the base and the hooded portion. The hooded portion includes a slot formed therein. A portion of the female component is magnetically attractive. The male component includes an insertion portion and a shaft extending from the insertion portion. A portion of the male component is formed by a magnet. The male component is configured to be coupled to the female component when the magnet is magnetically coupled to the portion of the female component that is magnetically attractive, the insertion portion is received within the pocket, and the shaft is received within the slot.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein:

FIG. 10 is a front elevational view of a magnetic fastener according to another embodiment of the invention;

FIG. 11 is a right side elevational view of the magnetic fastener according to FIG. 10;

FIG. 13 is a cross-sectional side elevational view of the magnetic fastener as taken from the perspective of section lines 13-13 in FIG. 10, wherein a male component of the magnetic fastener is not mechanically coupled to the female component thereof;

FIG. 14 is a cross-sectional side elevational view of the magnetic fastener from the same perspective as FIG. 13, wherein the male component is mechanically coupled to the female component;

FIG. 18 is a cross-sectional side elevational view of the magnetic fastener from the perspective of section lines 18-18 in FIG. 16, wherein a male component of the magnetic fastener is not mechanically coupled to the female component thereof;

FIG. 19 is a cross-sectional side elevational view of the magnetic fastener from the same perspective as FIG. 18, wherein the male component is mechanically coupled to the female component;

FIG. 20 is a front perspective view of a magnetic fastener according to another embodiment of the invention;

FIG. 21 is a right side elevational view of the magnetic fastener according to FIG. 20;

FIG. 22 is a cross-sectional elevational view of the magnetic fastener as taken from the perspective of section lines 22-22 in FIG. 21;

DETAILED DESCRIPTION OF THE PREFERRED EMBODIMENT

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 1:
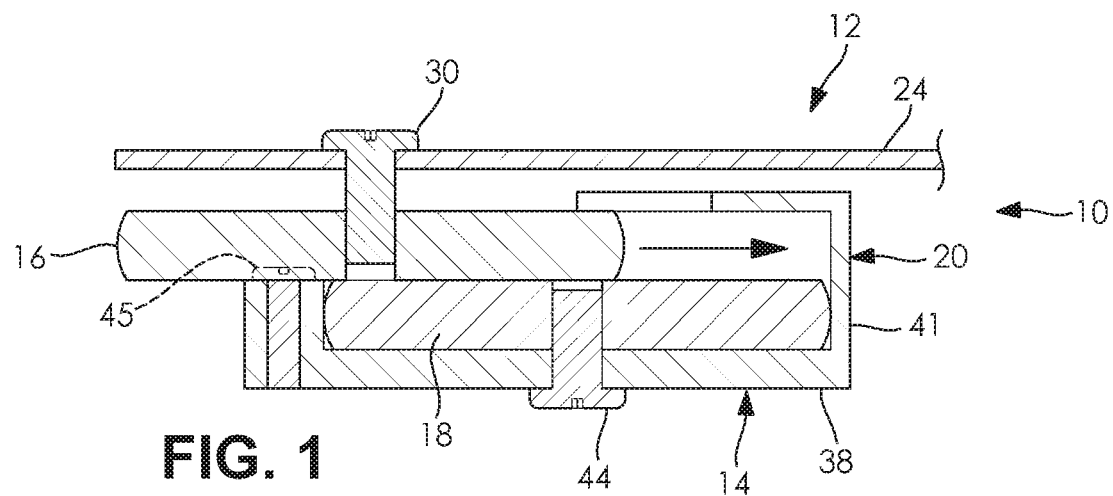
FIG. 1 is a fragmentary cross-sectional side elevational view of a magnetic fastener with a male component decoupled from a female component according to the invention.
Figure 2:
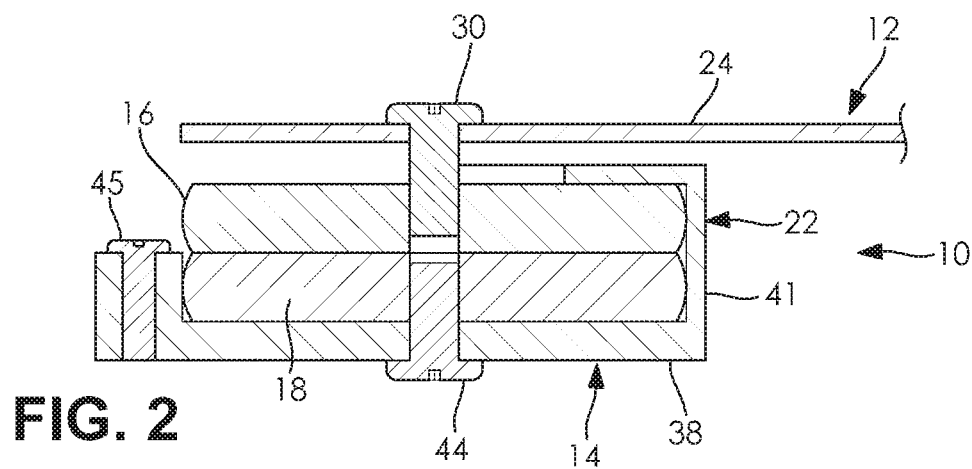
FIG. 2 is a fragmentary cross-sectional side elevational view of the magnetic fastener illustrating the male component coupled with the female component.

FIGS. 1 and 2 illustrate a magnetic fastener 10 including a male component 12 and a female component 14 according to an embodiment of the disclosure. The magnetic fastener 10 is configured to facilitate the coupling of complimentary magnets 16, 18 that are attached to the male component 12 and the female component 14, respectively. As illustrated, the magnetic fastener 10 is either in a first position 20 or a second position 22 dependent upon the proximity of the male component 12 from the female component 14. Due to the nature of magnetic fields, there is an inherent attraction between the complimentary magnets 16, 18 that compels an automated transition from the first position 20 to the second position 22, thereby closing the magnetic fastener 10.

Figure 3:
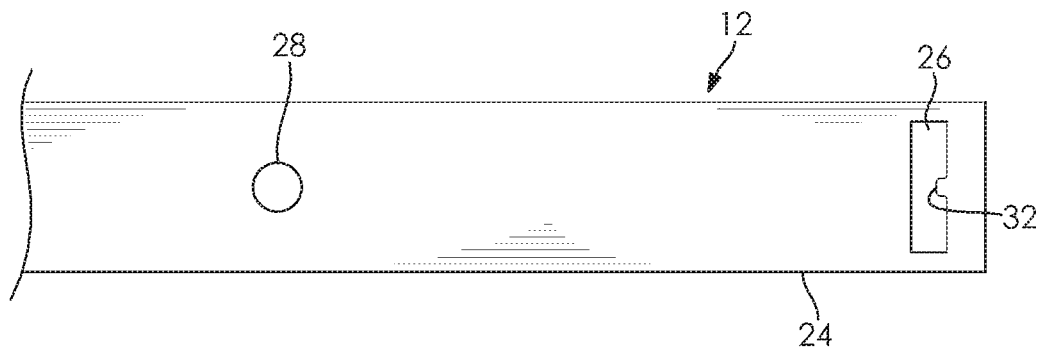
FIG. 3 is a top plan view of the male component according to the invention without a magnet disposed thereon.
Figure 4:
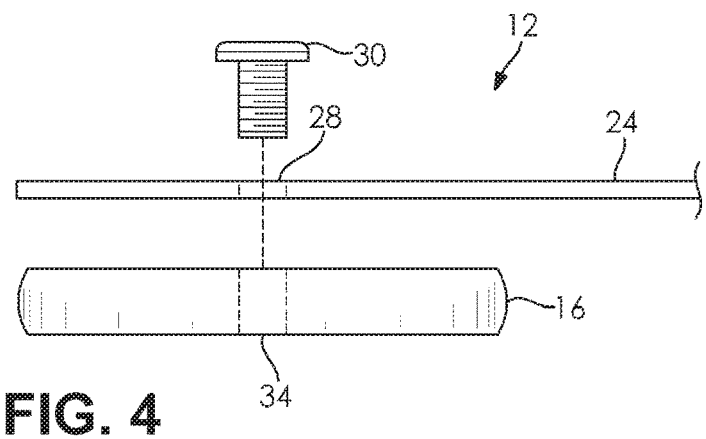
FIG. 4 is an exploded fragmentary side elevational view of the male component according to FIG. 3 with a magnet.

The male component 12, illustrated in FIGS. 3 and 4, includes a strap or a plate 24, a slot 26, an aperture 28, a fastener 30 and the magnet 16. The magnet 16 is configured to oppose the polar-specific positioning of the magnet 18 received within the female component 14. A specific positioning of the magnet 16 ensures the automated coupling intended, so the strap 24 is opposite and spaced from the female component 14. An abutment 32 is formed within the insert 26 to restrict or militate against inadvertent removal of an adjustable strap, belt, or other flexible material received within the slot 26. The adjustable strap can be a belt, a band, or other material, wherein it is desired to releasably fasten an object secured to the male component 12 to an object secured to the female component 14. For example, the objects can be articles of clothing, shoes, belts, an animal collar or halter and the like. Further, the aperture 28 is configured to receive the fastener 30 therein to secure the magnet 16 to the male component 12. The fastener 30 can be any fastener such as a bolt, a screw, a pin, a rivet and the like. An aperture 34 is formed in the magnet 16 and is also configured to receive the fastener 30 therein. The magnet 16 forms an insertion portion of the male component 12 with the fastener 30 forming a shaft extending away from the insertion portion.

Figure 5:
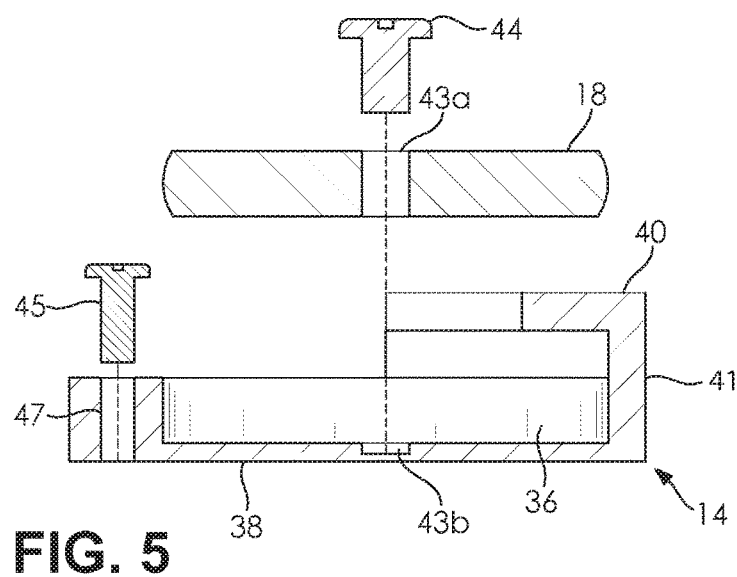
FIG. 5 is an exploded cross-sectional side elevational view of the female component according to the invention.
Figure 6:
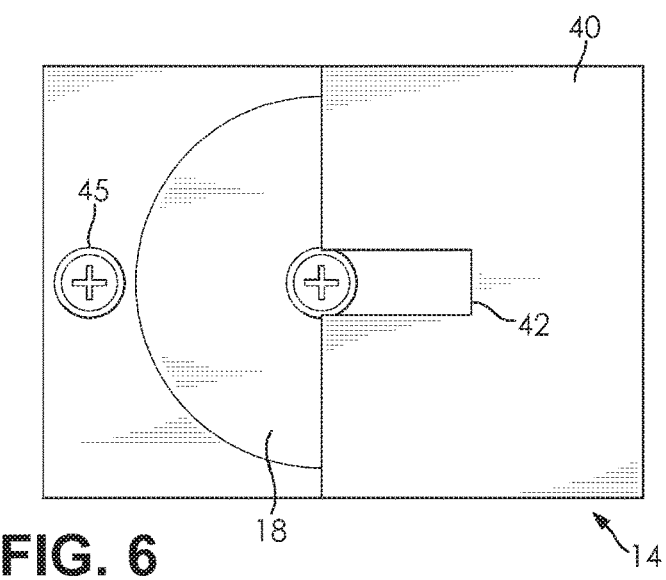
FIG. 6 is a top plan view of the female component according to FIG. 6.

Referring to FIGS. 5 and 6, the female component 14 includes a cavity 36 formed in a base 38 thereof. The cavity 36 is configured to receive the magnet 18 therein. In the embodiment shown, the base 38 has a substantially rectangular shape and the cavity 36 has a substantially circular shape. However, it is understood other shapes can be used for both the cavity 36 and the base 38 without departing from the scope of the invention. Further, the base 38 is produced from a durable material such as a plastic or a polymeric material, for example, but other materials can be used without departing from the scope of the invention. The female component 14 also includes a hooded portion 40 extending radially inwardly from a peripheral wall 41 forming the cavity 36 to a point intermediate the peripheral wall 41, and is substantially parallel with the floor of the base 38. The hooded portion 40 defines a pocket therein adjacent the cavity 36 and is configured to receive the magnet 16 of the male component 12 therein. Further, the hooded portion 40 includes a slot 42 formed therein configured to receive the fastener 30 therein as shown in FIG. 2. Apertures 43a, 43b are respectively formed within the magnet 18 and in the base 38. Each of the apertures 43a, 43b is configured to receive a fastener 44 therein, thereby securing the magnet 18 and the base 38 to one another. The fastener 44 can be any fastener such as a bolt, a screw, a pin, a rivet and the like. It is understood the magnet 18 can be secured in the female component 14 by any method such as by press fitting, using an adhesive, and the like as desired without departing from the scope of the invention. The female component 14 also includes an insert 47 that is configured to receive a fastener 45 to facilitate securing a strap to the base 38 of the female component 14. The fastener 45 can be any fastener such as a bolt, a screw, a pin, a rivet and the like. It is understood that any means can be used, such as a slot, to secure the strap to the base 38 of the female component 14. The strap can be a belt, a band, or other material configured to have a distal end secured to the object to be secured to the female component, wherein it is desired to releasably fasten the object secured to the female component 14 to the object secured to the male component 12.

Figure 7:
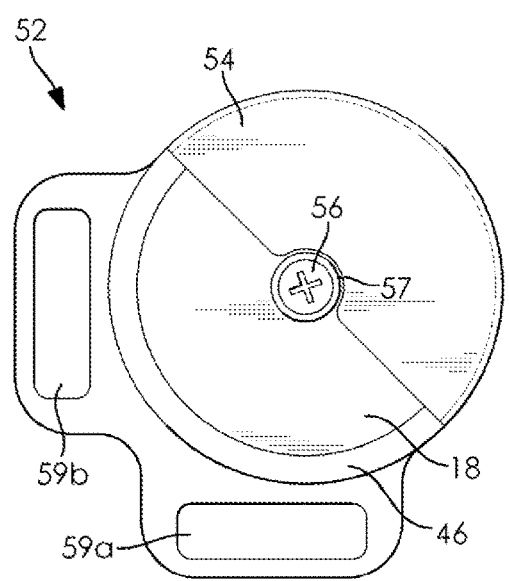
FIG. 7 is a top plan view of a substantially cylindrical female component according to another embodiment of the invention.
Figure 8:
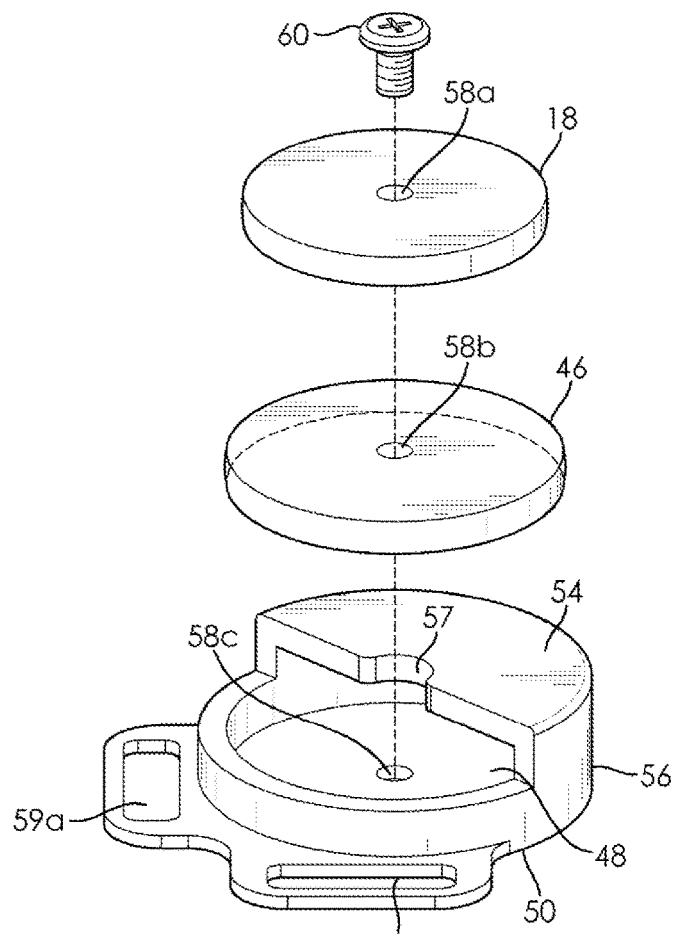
FIG. 8 is an exploded perspective view of the female component according to FIG. 7.

In another embodiment shown in FIGS. 7 and 8, a female component 52 can be configured to include a capsule 46, and a cavity 48 formed in a base 50. The capsule 46 is configured to receive the magnet 18 therein. Additionally, the cavity 48 is configured to receive the capsule 46 therein. In the embodiment shown, the base 50 has a substantially cylindrical shape and both the cavity 48 and the capsule 46 each have a substantially circular shape. However, it is understood other shapes can be used for both the cavity 48 and the base 50 without departing from the scope of the invention. Further, the base 50 is produced from a durable material such as a plastic or a polymeric material, for example, but other materials can be used without departing from the scope of the invention. The female component 52 also includes a hooded portion 54 extending radially inwardly from a peripheral wall 56 forming the cavity 48 and terminating at a point intermediate the peripheral wall 56. The hooded portion 54 is substantially parallel with the floor of the base 50 and defines a pocket therein adjacent the cavity 48 configured to receive the magnet 18 therein. Further, the hooded portion 54 includes a slot 57 formed therein configured to receive the fastener 30 therein as show in FIG. 9. A plurality of apertures 58*a*, 58*b*, 58*c* is respectively formed within the magnet 18, the capsule 46, and the base 50. Each of the apertures 58*a*, 58*b*, 58*c* is configured to receive a fastener 60 therein, thereby securing the magnet 18, the capsule 46 and the base 50 to one another. The fastener 60 can be any fastener such as a bolt, a screw, a pin, a rivet and the like. It is understood the magnet 18 can be secured in the female component 52 by any method as desired such as by press fitting, use of an adhesive, and the like without departing from the scope of the invention. The female component 52 also has a plurality of slots 59*a*, 59*b* configured to receive a plurality of straps within them. The plurality of straps can be a plurality of belts, a plurality of bands, or other materials, wherein it is desired to releasably fasten the object secured to the female component 52 to the object secured to the male component 12.

Figure 9:
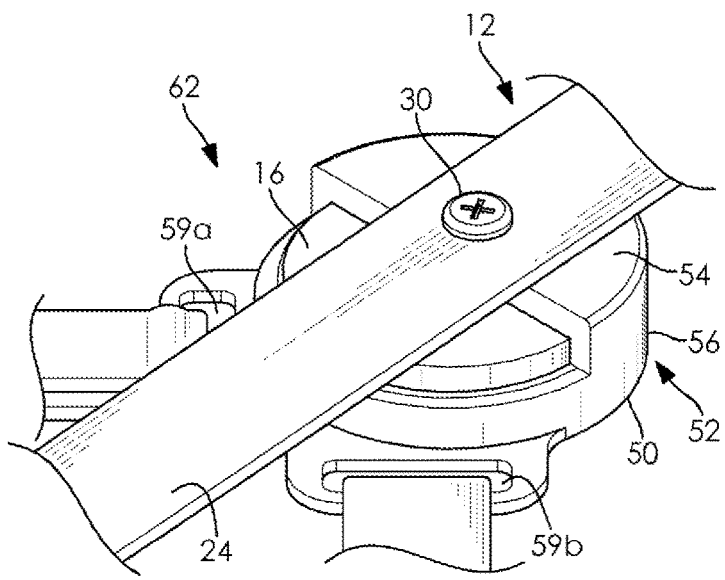
FIG. 9 is fragmentary perspective view of a magnetic fastener including the female component of the other embodiment of the invention according to FIGS. 7-8.

FIG. 9 illustrates a magnetic fastener 62 including the male component 12 and the female component 52 according to an alternate embodiment of the disclosure. The magnetic fastener 62 is configured to facilitate coupling of the plurality of complimentary magnets 16, 18 attached to the male component 12 and the female component 52, respectively. The magnetic fastener 62, as illustrated, shows the male component 12 and the female component 52 fully coupled to one another due to an inherent magnetic attraction prevalent within each of the complimentary magnets 16, 18.

The magnetic fastener 10, 62 is closed once a full coupling of the magnets 16, 18 occur and the fastener 30 is fully engaged with the slot 42, 57. During installation of the magnetic fastener 10, 62, the female component 14, 52 is positioned in anticipation of which direction the strongest axial load would likely be imposed so that in the event of an applied force, the stress of the force will cause the male component 12 to abut the peripheral wall 41, 56 of the female component 14, 52. Consequently, the peripheral wall 41, 56 militates against relative movement between the male component 12 and the female component 14, 52 due to axial loads imposed upon the magnetic fastener 10, 62, preventing inadvertent disengagement of the male component 12 from the female component 14, 52. However, when a user uninstalls the magnetic fastener 10, 62 an intentional removal of the male component 12 from the female component 14, 52 in the direction opposite the peripheral wall 41, 56 requires a minimal force. Also, the hooded portion 40, 54 further prevents inadvertent disengagement in the presence of a lateral load, as the hooded portion 40, 54 prevents the magnet 16 of the male component 12 from detaching from the magnet 18 attached to the female component 14, 52.

The magnetic fasteners 10, 62 provide advantages over fasteners of prior art. For example, the magnetic fasteners 10, 62 replace complex mechanical fasteners that may be difficult for some individuals to manipulate to release. For an individual with a physical disability, the fastener or the present invention greatly increases a freedom, mobility and accessibility to the individual by making tasks involving manipulation of the fastener easier.

Although the embodiments shown and described herein are used for a fastener for a belt, a strap, a band and the like, it is understood that the fastener can be used with other objects and in other applications as desired, for example an animal collar or halter.

FIGS. 10-14 illustrate a magnetic fastener 110 according to another embodiment of the present disclosure. The magnetic fastener 110 includes a male component 112 and a female component 114 that are configured to be magnetically and mechanically coupled to each other. The magnetic fastener 110 is substantially similar in many respects to the magnetic fasteners 10, 62 illustrated in FIGS. 1-9 except the magnetic fastener 110 includes only a single permanent magnet 116 associated with the male component 112 instead of utilizing a pair of complimentary permanent magnets 16, 18 as disclosed with respect to the magnetic fasteners 10, 62. The magnetic connection is instead provided by forming at least a portion of the female component 114 from a magnetically attractive material configured to be magnetically attracted to the magnet 116 of the male component 112. The magnet 116 may be formed from any type of magnetic material and may be a ceramic magnet or a neodymium magnet, as non-limiting examples.

The magnetically attractive portion of the female component 114 may be formed from a ferrous material having the capability to align a polarity thereof to the magnet 116 of the male component 112 when the magnet 116 is placed in close proximity to the magnetically attractive portion of the female component 114 such that the magnetic field of the magnet 116 is capable of applying a magnetic coupling force to the ferrous material. However, any magnetically attractive material may be utilized for forming the magnetically attractive portion of the female component 114 without departing from the scope of the present invention, as desired, including any variety of alloys or composites only partially including a magnetically attractive material therein. As should be understood by one skilled in the art, the placement of the magnet 116 immediately adjacent the magnetically attractive portion of the female component 114 may cause the magnetically attractive portion to maintain the polarity thereof following disengagement of the magnet 116 therefrom such that the magnetically attractive portion of the female component 114 may operate substantially similarly to the magnet 18 of the female components 14, 52 disclosed hereinabove. The magnetic fastener 110 accordingly operates utilizing the same general concepts as the magnetic fasteners 10, 62 without requiring the need for the incorporation of the separately provided and complimentary magnet 18 within the corresponding female component 14, 52, thereby simplifying the assembly of the magnetic fastener 110 while also reducing the cost thereof.

As illustrated, the magnetic fastener 110 is either in a first position 120 or a second position 122 dependent upon the proximity of the male component 112 to the female component 114. The first position 120 is representative of a configuration of the magnetic fastener 110 when the male component 112 and the female component 114 are not magnetically and mechanically coupled to each other while the second position 122 is representative of a configuration of the magnetic fastener 110 when the male component 112 and the female component 114 are both magnetically and mechanically coupled to each other. As explained hereinafter, the male component 112 includes an insertion portion that is configured to be received within a pocket of the female component 114 when the magnetic fastener 110 is placed in the second position 122. Furthermore, the female component 114 includes a slotted portion that is configured to receive a shaft extending from the insertion portion of the male component 112 when the magnetic fastener 110 is placed in the second position 122. The interaction between the insertion portion and the pocket as well as the shaft and the slotted portion establishes the mechanical coupling between the male component 112 and the female component 114 that is complimentary to the magnetic coupling that is also formed therebetween when the magnetic fastener 110 is placed in the second position 122.

The male component 112 generally includes a strap 124, a fastener 130, and the magnet 116. The magnet 116 generally forms the insertion portion of the male component 112 while the fastener 130 generally forms the shaft of the male component 112 configured for reception within the slotted portion of the female component 114. The magnet 116 is configured to include a desired polarity to allow for the magnet 116 to be magnetically coupled to the magnetically attractive portion of the female component 114 when the magnetic fastener 110 is placed in the second position 122 thereof.

The adjustable strap 124 can be a belt, a band, or other material, wherein it is desired to releasably fasten an object secured to the male component 112 to an object secured to the female component 114. For example, the objects can be articles of clothing, shoes, belts, an animal collar or halter, and the like. The strap 124 may alternatively be a rigid component such as a plate or the like without departing from the scope of the present invention. The strap 124 includes an aperture 128 formed therethrough configured to receive the fastener 130 therein to secure the magnet 116 to the male component 112.

The fastener 130 can be any fastener such as a bolt, a screw, a pin, a rivet and the like. An aperture 117 is formed through the magnet 116 and is also configured to receive the fastener 130 therein. The fastener 130 accordingly couples the magnet 116 to the strap 124 with the magnet 116 spaced apart from the strap 124 with respect to an axial direction of the fastener 130. The magnet 116, the aperture 128, the fastener 130, and the aperture 117 may all be substantially cylindrical in shape, but alternative shapes may be utilized without necessarily departing from the scope of the present invention.

The fastener 130 is formed from an inner member 131 and an outer member 132, each of which are substantially cylindrical in shape. The inner member 131 includes a threaded outer surface that is threaded into a threaded inner surface of the outer member 132 to couple the inner member 131 to the outer member 132. The inner member 131 and the outer member 132 are threaded to each other at a central portion of the fastener 130. The inner member 131 includes a head 133 at an end thereof opposite the outer member 132 and the outer member 132 similarly includes a head 134 at an end thereof opposite the inner member 131, wherein each of the heads 133, 134 has a larger diameter than the corresponding member 131, 132. The outer member 132 is received within the aperture 128 of the strap 124 while a portion of the inner member 131 disposed between the threaded portion of the outer member 132 and the head 133 of the inner member 131 is surrounded by a sleeve 135. A first washer 101 is disposed around the outer member 132 at a position between the head 134 thereof and an outer side of the strap 124 facing away from the magnet 116 while a second washer 102 is disposed around the outer member 132 at a position between an end of the sleeve 135 and an inner side of the strap 124 facing towards the magnet 116. The inner member 131, the outer member 132, the sleeve 135, the first washer 101, and the second washer 102 may all be substantially cylindrical in shape, but other shapes may also be utilized, as desired.

The magnet 116 is encapsulated within a cover assembly 103 including a first cover 104 and a second cover 105, each of which are provided as open-ended cup structures with the open ends thereof facing towards each other. The first cover 104 is configured to engage a portion of the female component 114 and may be formed from a plastic material. The use of the plastic material prevents an undesired metal on metal sliding contact between the cover assembly 103 and the female component 114 during a positioning of the magnetic fastener 110 between the first and second positions 120, 122 thereof. A thickness of the first cover 104 with respect to the axial direction of the fastener 130 is small enough to allow for the magnet 116 to maintain the magnetic attraction to the magnetically attractive portion of the female component 114 when the magnetic fastener 110 is in the second position 122 thereof (FIG. 14), despite the relatively small spacing therebetween as provided by the first cover 104. This spacing may also be selected to prescribe the desired degree of magnetic attraction for releasably coupling the magnet 216 to the desired portion of the female component 114, wherein the magnetic attraction is not prohibitively difficult to disengage. As one non-limiting example, the thickness of the first cover 104 may be about 0.030 inches. The second cover 105 is disposed between the magnet 116 and the sleeve 135 and may be formed from a metallic material. The aperture 117 formed through the magnet 116 may be configured to receive the head 133 of the inner member 131, wherein the head 133 includes a larger diameter than an aperture 106 formed through the second cover 105 to prevent axial removal of the fastener 130 from the cover assembly 103.

The first washer 101, the second washer 102, the cover assembly 103, and the sleeve 135 are configured to protect the magnet 116, the strap 124, and the fastener 130 from undesired damage, abrasion, or disassembly during use of the magnetic fastener 110. However, it should be apparent to one skilled in the art that the magnetic fastener 110 may operate substantially identically in the absence of the listed components without necessarily departing from the scope of the present invention. For example, the fastener 130 may be directly coupled to each of the magnet 116 and the strap 124 absent the intervening components while still producing the same general shape and configuration of the male component 112 including the magnet 116 being spaced from the strap 124 with respect to the axial direction of the fastener 130. Additionally, the magnet 116 may be provided in the absence of the cover assembly 103 without altering the manner of use of the male component 112.

If the magnet 116 is encapsulated by the cover assembly 103 as shown and described, then the combined assembly of the magnet 116 and the cover assembly 103 forms the insertion portion of the male component 112. Additionally, if the fastener 130 is encapsulated by the sleeve 135, then the combined assembly of the fastener 130 and the sleeve 135 forms the shaft of the male component 112. As used hereinafter, references to the insertion portion, such as the relative dimensions thereof or the manner of use thereof, may refer to the magnet 116 individually or the described assembly of the magnet 116 and the cover assembly 103. Similarly, as used hereinafter, references to the shaft, such as the relative dimensions thereof or the manner of use thereof, may refer to the fastener 130 individually or the described assembly of the fastener 130 and the surrounding sleeve 135.

Figure 12:
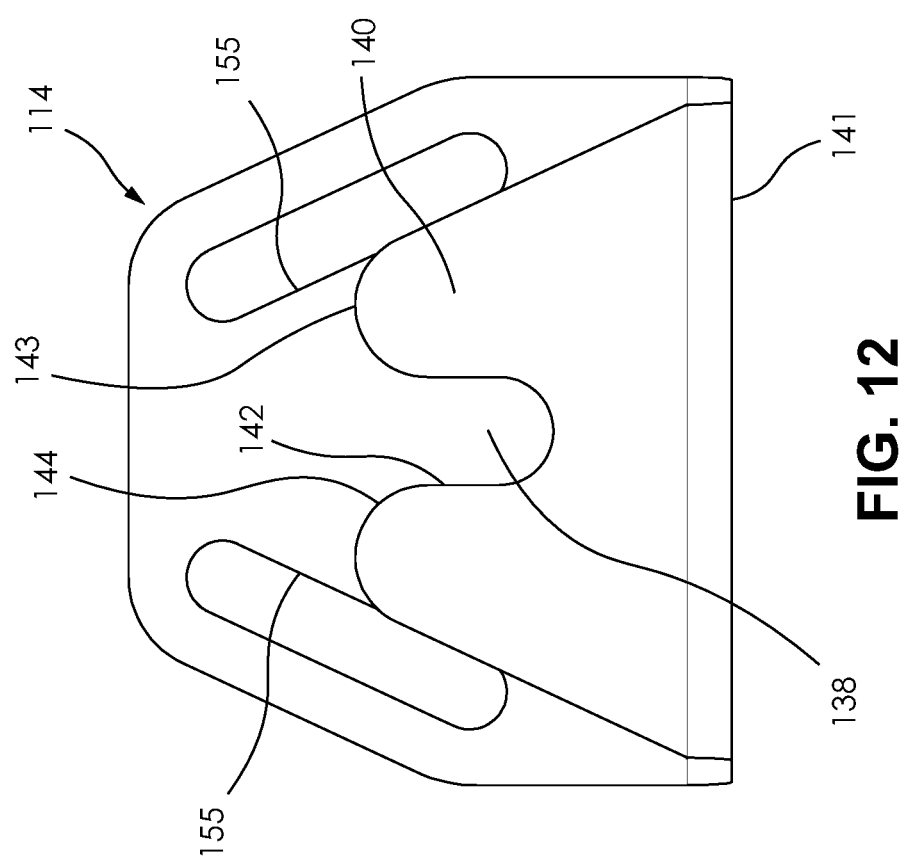
FIG. 12 is front elevational view of a female component according to the magnetic fastener of FIG. 10.
Figure 16:
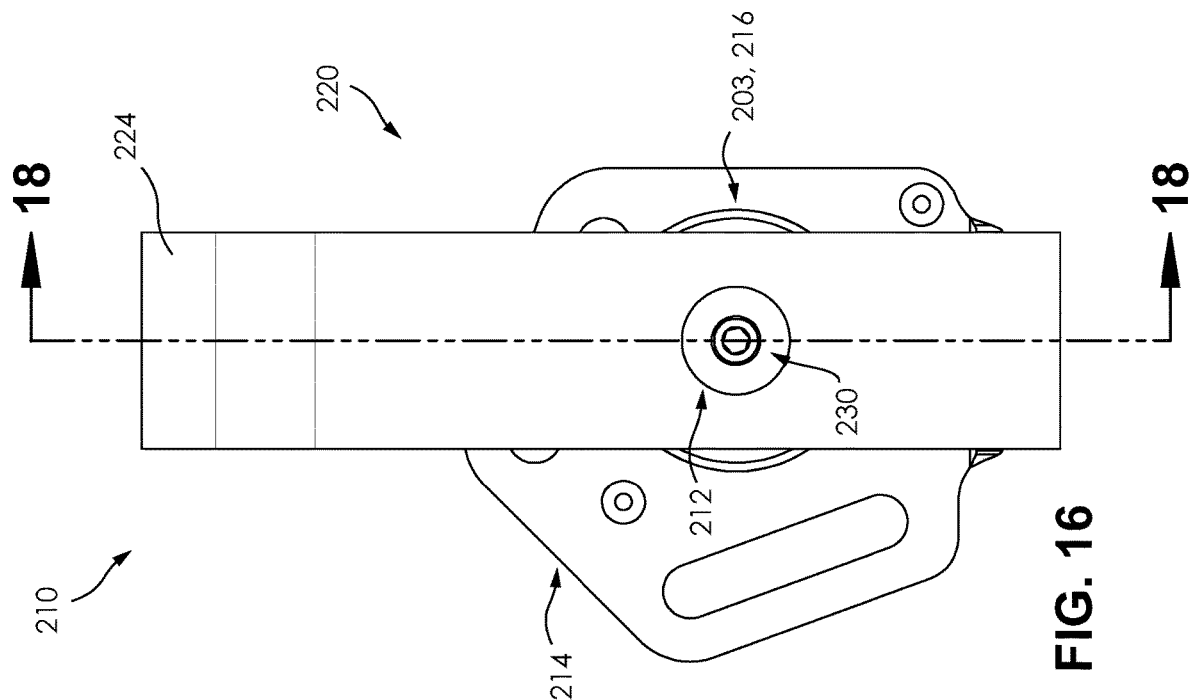
FIG. 16 is a front elevational view of the magnetic fastener according to FIG. 15.
Figure 15:
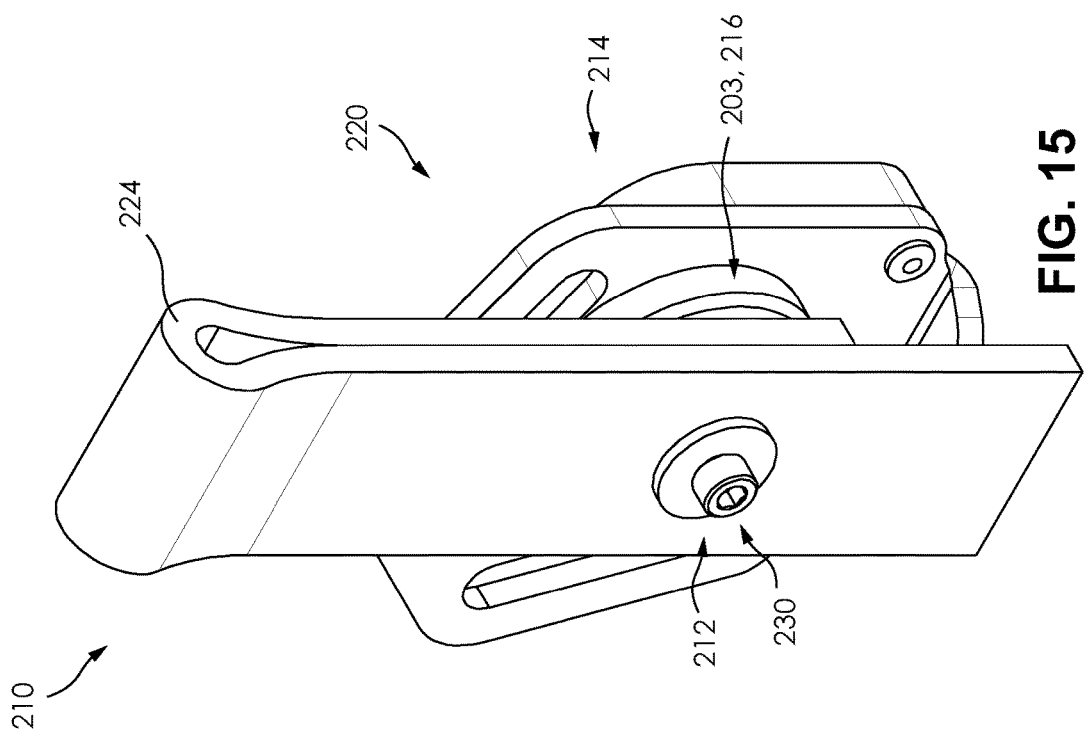
FIG. 15 is a front perspective view of a magnetic fastener according to another embodiment of the invention.

Referring now primarily to FIGS. 12-14, the female component 114 includes a base 138, a hooded portion 140, and a peripheral wall 141 connecting the base 138 to the hooded portion 140. The base 138 is spaced apart from the hooded portion 140 with respect to the axial direction of the shaft when the male component 112 is coupled to the female component 114 in the second position 122 of the magnetic fastener 110. The base 138 is substantially planar in configuration and the hooded portion 140 is also substantially planar in configuration with the base 138 arranged substantially parallel to the hooded portion 140. The peripheral wall 141 is also substantially planar in configuration and is arranged perpendicular to each of the base 138 and the hooded portion 140. The peripheral wall 141 is disposed at an end of the female component 114 with respect to a direction perpendicular to the axial direction of the shaft when the magnetic fastener 110 is in the second position 122 thereof. The base 138, the hooded portion 140, and the peripheral wall 141 cooperate to form a substantially U-shaped configuration of the female component 114 as shown in FIGS. 13 and 14.

The hooded portion 140 extends radially inwardly from the peripheral wall 141 over a portion of the base 138 to form the aforementioned pocket between the base 138 and the hooded portion 140. The pocket is configured to receive the insertion portion of the male component 112 therein. A spacing between the base 138 and the hooded portion 140 with respect to the axial direction of the fastener 130 may be greater than the thickness of the insertion portion to allow for a limited degree of play of the insertion portion when received within the pocket.

The hooded portion 140 includes a slot 142 formed therein extending from an edge 143 of the hooded portion 140 disposed at a maximum distance from the peripheral wall 141 with respect to the direction perpendicular to the axial direction of the shaft when the magnetic fastener 110 is in the second position 122 thereof. The slot 142 forms the aforementioned slotted portion of the female component 114 configured to receive the shaft of the male component 112. The slot 142 extends longitudinally and rectilinearly in the direction perpendicular to the axial direction of the shaft when the magnetic fastener 110 is in the second position 122 thereof with the slot 142 extending towards the peripheral wall 141. In the provided embodiment, the direction of longitudinal extension of the slot 142 is further arranged perpendicular to the direction of longitudinal extension of the peripheral wall 141. However, the peripheral wall 141 may include any shape when connecting the base 138 to the hooded portion 140 in place of the illustrated planar configuration, such as a substantially semi-cylindrical shape as is disclosed with reference to the magnetic fasteners 10, 62 without departing from the scope of the present invention. If a semi-cylindrical shape is utilized, the semi-cylindrical shape may substantially compliment the substantially cylindrical shape of the insertion portion formed by the magnet 116 and/or the cover assembly 103 surrounding the magnet 116, depending on the optional presence of the cover assembly 103 as discussed hereinabove.

The edge 143 of the hooded portion 140 further defines a mouth 144 leading into the slot 142. The mouth 144 is formed by a pair of arcuate surfaces merging into the slot 142 on opposing sides thereof to form a piloting feature for more easily placing the shaft into the slot 142 in the direction perpendicular to the axial direction of the shaft during the positioning of the magnetic fastener 110 into the second position 122 thereof.

The base 138 further includes a pair of coupling openings 155 formed therein with each of the coupling openings 155 formed adjacent laterally opposed sides of the base 138. Each of the coupling openings 155 is shown as a slot disposed at opposing inclined angles relative to the peripheral wall 141 of the female component 114, but alternative configurations may be utilized without departing from the scope of the present invention. The illustrated configuration of the female component 114 including the pair of the coupling openings 155 may be most suitable for coupling the female component 114 to a pair of straps extending away from the female component 114 in opposing inclined directions relative to the illustrated strap 124 associated with the male component 112. This configuration may be suitable for forming a three-strapped halter for use with an animal such as a horse, as desired, wherein the substantially planar surface of the base 138 facing away from the hooded portion 140 is configured to comfortably abut the associated animal. The hooded portion 140 is also shown as including a substantially trapezoidal perimeter shape having inclined surfaces corresponding to a perimeter shape of the base 138 and the inclined configuration of the coupling openings 155.

In the present embodiment, the base 138 of the female component 114 is the magnetically attractive portion thereof configured for being magnetically coupled to the magnet 116 of the male component 112. However, the entirety of the female component 114 may be formed from a single continuous and monolithically formed extension of the magnetically attractive material as is best illustrated in FIGS. 13 and 14 without altering the method of operation of the magnetic fastener 110. However, the female component 114 may alternatively be formed from multiple different portions or segments coupled to each other so long as the portion of the base 138 forming the pocket of the female component 114 is formed from the magnetically attractive material. For example, the magnetically attractive material may be provided as an insert located within the remainder of the base 138 in similar fashion to the magnet 18 of the magnetic fasteners 10, 62 disclosed in FIGS. 1-9.

In order to provide the mechanical coupling of the male component 112 to the female component 114 during a positioning of the magnetic fastener 110 to the second position 122 thereof, the following relationships are established. The shaft includes a first diameter and the insertion portion includes a second diameter, wherein the second diameter is greater than the first diameter. Additionally, the slotted portion includes a width from one side thereof to the opposing side thereof that is slightly greater than the first diameter and smaller than the second diameter, wherein the width is measured in a direction perpendicular to the longitudinal direction of extension of the slotted portion. Accordingly, the shaft is able to be slidably received within the slotted portion while the insertion portion cannot pass axially through the slotted portion when the shaft is slidably received within the slotted portion. If non-cylindrical components are utilized for forming the shaft and the insertion portion, it should be understood that the first and second diameters may refer to the dimension of each of the components parallel to the width direction for establishing the desired relationships.

In use, the magnetic fastener 110 is repositioned from the first position 120 thereof to the second position 122 thereof as follows. First, the male component 112 is moved towards the base 138 of the female component 114 with the insertion portion thereof as formed by the magnet 116 passing by the edge 143 of the hooded portion 140 with respect to the axial direction of the shaft as formed by the fastener 130. The insertion portion first engages the portion of the base 138 offset from the edge 143 and outside of the pocket of the female component 114. The magnet 116 then magnetically engages the magnetically attractive material forming the base 138 to substantially affix an axial position of the male component 112. As mentioned above, the magnetic attraction between the magnet 116 and the magnetically attractive portion of the base 138 is strongest in the axial direction of the shaft to allow for the magnet 116 to be slid towards the slot 142 despite the magnetic attraction between the magnet 116 and the base 138. The insertion portion is accordingly moved in the direction perpendicular to the axial direction of the shaft into the slot 142 with the insertion portion entering the pocket formed between the base 138 and the hooded portion 140. An outer circumferential surface of the insertion portion is configured to engage the peripheral wall 141 when the shaft of the male component 112 is fully received within the slot 142 with respect to the longitudinal direction thereof. The slot 142 accordingly prevents lateral movement of the male component 112 relative to the longitudinal direction of the slot 142 while the end of the slot 142 as well as the peripheral wall 141 prevents further movement of the male component 112 in the longitudinal direction of the slot 142 towards the peripheral wall 141. The magnet 116 also maintains the magnetic connection to the magnetically attractive portion of the base 138 while the insertion portion is maintained within the pocket. The hooded portion 140 and the base 138 further prevent any undesired motion of the insertion portion in the axial direction of the shaft.

The magnetic fastener 110 may then be repositioned from the second position 122 to the first position 120 by moving the male component 112 in the longitudinal direction of the slot 142 back towards the edge 143 until the insertion portion is clear of the hooded portion 140. The male component 112 can then be disengaged from the female component 114 by pulling the male component 112 away from the base 138 in the axial direction of the shaft against the magnetic attraction present between the base 138 and the magnet 116.

FIGS. 15-19 illustrate a magnetic fastener 210 according to yet another embodiment of the present invention. The magnetic fastener 210 comprises a male component 212 and a female component 214 in similar fashion to the previously disclosed magnetic fasteners 10, 62, 110. The magnetic fastener 210 similarly includes a magnet 216 that is magnetically attracted to a corresponding magnetically attractive portion of the female component 214. The magnetically attractive portion of the female component 214 may be formed from any of the materials described hereinabove as forming the magnetically attractive portion of the female component 114 of the magnetic fastener 110.

As illustrated, the magnetic fastener 210 is either in a first position 220 or a second position 222 dependent upon the proximity of the male component 212 to the female component 214. The first position 220 is representative of a configuration of the magnetic fastener 210 when the male component 212 and the female component 214 are not magnetically and mechanically coupled to each other while the second position 222 is representative of a configuration of the magnetic fastener 210 when the male component 212 and the female component 214 are both magnetically and mechanically coupled to each other. As explained hereinafter, the male component 212 includes an insertion portion that is configured to be received within a pocket of the female component 214 when the magnetic fastener 210 is placed in the second position 222. Furthermore, the female component 214 includes a slotted portion that is configured to receive a shaft extending from the insertion portion of the male component 212 when the magnetic fastener 210 is placed in the second position 222. The interaction between the insertion portion and the pocket as well as the shaft and the slotted portion establishes the mechanical coupling between the male component 212 and the female component 214 that is complimentary to the magnetic coupling that is also formed therebetween when the magnetic fastener 210 is placed in the second position 222.

The male component 212 generally includes a strap 224, a fastener 230, an enlarged portion 260, and the magnet 216. In similar fashion to the magnetic fastener 110, the fastener 230 generally forms the shaft of the male component 212 configured for reception within the slotted portion of the female component 214. However, in contrast to the magnetic fastener 110, the enlarged portion 260 forms the insertion portion of the male component 212 instead of the magnet 216. The magnet 216 is configured to include a desired polarity to allow for the magnet 216 to be magnetically coupled to the magnetically attractive portion of the female component 214 when the magnetic fastener 210 is placed in the second position 222 thereof, as explained in greater detail hereinafter when explaining the female component 214.

The adjustable strap 224 can be a belt, a band, or other material, wherein it is desired to releasably fasten an object secured to the male component 212 to an object secured to the female component 214. For example, the objects can be articles of clothing, shoes, belts, an animal collar or halter, and the like. The strap 224 may alternatively be a rigid component such as a plate or the like without departing from the scope of the present invention. The strap 224 includes an aperture 228 formed therethrough configured to receive the fastener 230 therein to secure the magnet 216 to the remainder of the male component 212.

As best shown in FIG. 18, the fastener 230 is formed from an inner member 231 and an outer member 232, each of which are substantially cylindrical in shape. The inner member 231 includes a threaded outer surface that is threaded into a threaded inner surface of the outer member 232 to couple the inner member 231 to the outer member 232. The inner member 231 and the outer member 232 are threaded to each other at a substantially central portion of the fastener 230. The inner member 231 includes a head 233 at an end thereof opposite the outer member 232 and the outer member 232 similarly includes a head 234 at an end thereof opposite the inner member 231, wherein each of the heads 233, 234 has a larger diameter than the corresponding member 231, 232. The inner member 231 is received within the aperture 228 of the strap 224. The portion of the inner member 231 received within the aperture 228 may be surrounded by a sleeve 208 to protect the strap 224 from the threads of the inner member 231. A portion of the outer member 232 disposed between the head 234 of the outer member 232 and the magnet 216 is surrounded by a sleeve 235. A first washer 201 is disposed around the inner member 231 at a position between the head 233 thereof and an outer side of the strap 224 facing away from the magnet 216 while a second washer 202 is disposed around the outer member 232 at a position between an end of the sleeve 235 and the head 234 thereof. The inner member 231, the outer member 232, the sleeve 235, the first washer 201, and the second washer 202 may all be substantially cylindrical in shape, but other shapes may also be utilized, as desired.

The magnet 216 is encapsulated within a cover assembly 203 including a first cover 204 and a second cover 205, each of which are provided as open-ended cup structures with the open ends thereof facing towards each other. The first cover 204 is configured to engage a portion of the female component 214 and may be formed from a plastic material. A thickness of the first cover 204 with respect to the axial direction of the fastener 230 is small enough to allow for the magnet 216 to maintain the magnetic attraction to the magnetically attractive portion of the female component 214 when the magnetic fastener 210 is in the second position 222 thereof (FIG. 19), despite the relatively small spacing therebetween as provided by the first cover 204. The second cover 205 is disposed between the magnet 216 and the strap 224 and may be formed from a metallic material. The first cover 204 includes an aperture formed therethrough, the second cover 205 includes an aperture formed therethrough, and the magnet 216 includes an aperture formed therethrough, wherein the apertures are concentrically arranged with each of the apertures configured to receive the fastener 230 therethrough. An outer surface of the first cover 204 engages the sleeve 235 and an outer surface of the second cover 205 engages the inwardly facing surface of the strap 224.

The first washer 201, the cover assembly 203, and the sleeve 235 are configured to protect the magnet 216, the strap 224, and the fastener 230 from undesired damage or disassembly during use of the magnetic fastener 210. However, it should be apparent to one skilled in the art that the magnetic fastener 210 may operate substantially identically in the absence of the listed components without necessarily departing from the scope of the present invention. For example, the fastener 230 may be passed through the magnet 216 and the strap 224 absent the presence of the first washer 201 and the cover assembly 203 without altering the manner of use of the male component 212.

The second washer 202 includes an enlarged diameter in comparison to the head 234 of the outer member 232 of the fastener as well as the sleeve 235 surrounding the outer member 232 adjacent the second washer 202. The second washer 202 accordingly forms the enlarged portion 260 of the male component 212 which is also representative of the insertion portion thereof. If the fastener 230 is encapsulated by the sleeve 235, then the combined assembly of the fastener 230 and the sleeve 235 forms the shaft of the male component 212 spacing the enlarged portion 260 from the magnet 216 and/or the associated cover assembly 203 surrounding the magnet 216. As used hereinafter, references to the shaft, such as the relative dimensions thereof or the manner of use thereof, may refer to the fastener 230 individually or the described assembly of the fastener 230 and the surrounding sleeve 235.

The female component 214 includes a base 238, a hooded portion 240, and a peripheral wall 241 connecting the base 238 to the hooded portion 240. The base 238 is spaced apart from the hooded portion 240 with respect to the axial direction of the shaft when the male component 212 is coupled to the female component 214 in the second position 222 of the magnetic fastener 210. The base 238 is substantially planar in configuration and the hooded portion 240 is also substantially planar in configuration with the base 238 arranged substantially parallel to the hooded portion 240. The peripheral wall 241 connects the base 238 to the hooded portion 240 with respect to a direction perpendicular to each of the base 238 and the hooked portion 240.

Figure 17:
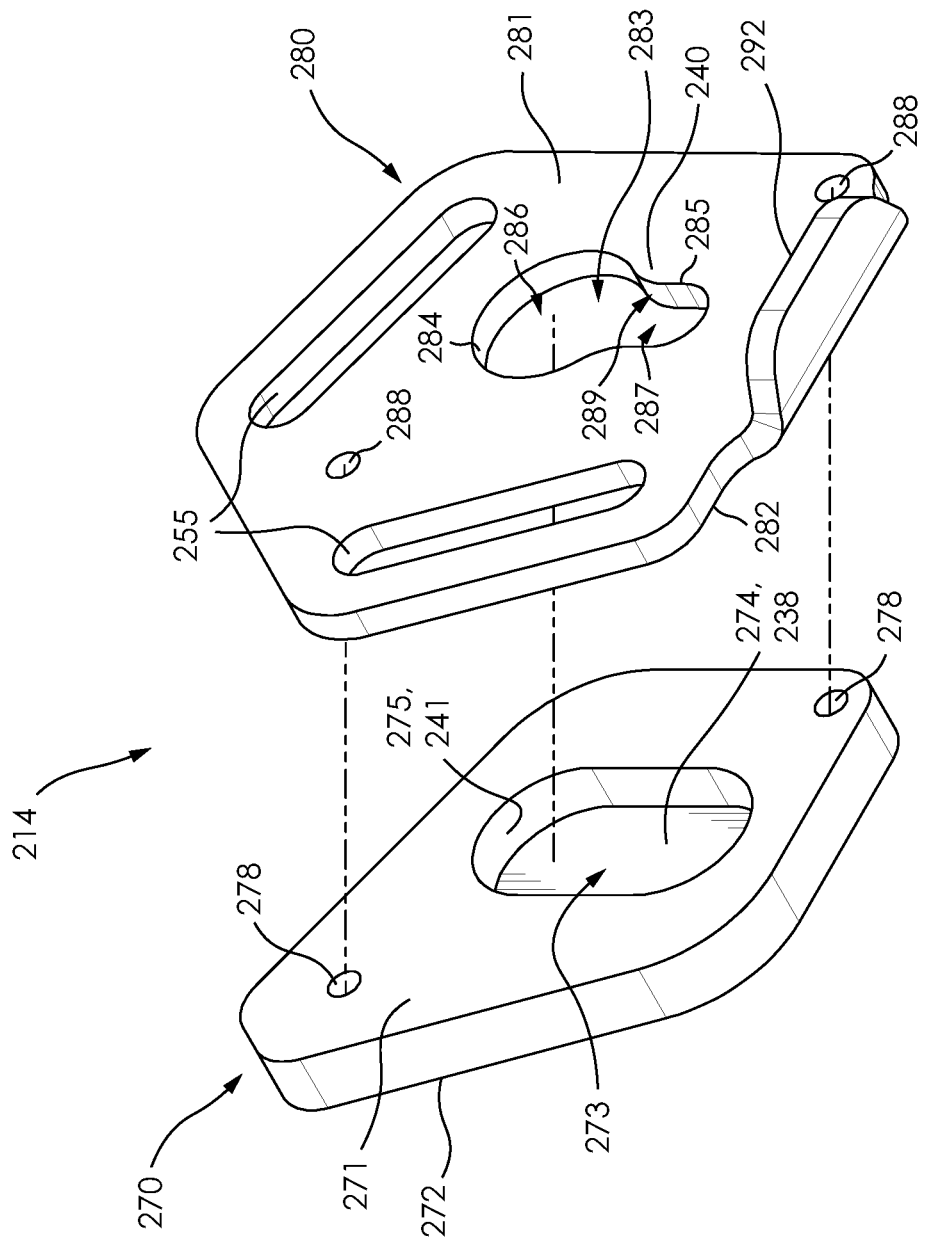
FIG. 17 is an exploded perspective view of a female component of the magnetic fastener according to FIG. 15.

Referring now primarily to FIGS. 17-19, the female component 214 is generally formed by the cooperation of a rear plate 270 and a front plate 280. The rear plate 270 is formed by a portion of the female component 214 spaced distally from the strap 224. The rear plate 270 includes a planar first surface 271 and a planar second surface 272 formed opposite the first surface 271. The first surface 271 is configured to engage the front plate 280 while the second surface 272 faces away from the front plate 280. The second surface 272 may be configured to engage a portion of an animal such as a horse if the magnetic fastener 210 is used as a portion of a halter assembly or the like, hence the need for the second surface 272 to be planar so as not to scratch or gouge the corresponding animal when the rear plate 270 bears against the animal during use of the halter assembly.

The rear plate 270 includes an opening 273 formed therein with the opening 273 indented into the first surface 271 in a direction towards the second surface 272, but does not penetrate through the rear plate 270 all the way to the second surface 272. The opening 273 is defined by a planar end surface 274 spaced from the first surface 271 with a peripheral surface 275 connecting the end surface 274 to the first surface 271 around the periphery of the end surface 274. The peripheral surface 275 may be arranged substantially perpendicular to the end surface 274. In the present embodiment, the end surface 274 includes a peripheral shape having a rectangular central portion and two opposing semi-circular portions, wherein such a shape may be referred to as a stadium or obround shape. The portion of the rear plate 270 formed between the end surface 274 and the second surface 272 forms the base 238 of the female component 214 while the portion of the rear plate 270 defining the peripheral surface 275 forms the peripheral wall 241 of the female component 214.

The front plate 280 includes a planar first surface 281 and an opposing planar second surface 282. The second surface 282 of the front plate 280 is configured to engage the first surface 271 of the rear plate 270. The front plate 280 includes a pair of coupling openings 288 formed therethrough configured for alignment with a pair of coupling openings 278 formed through the rear plate 270. The coupling openings 278, 288 are configured to receive fasteners (not shown) therethrough with an end of each of the fasteners inset from the second surface 272 of the rear plate 270 to once again prevent an incidence of any type of projection extending from the second surface 272 of the rear plate 270 to avoid interference between the female component 214 and any adjoining surface.

The front plate 280 includes a key-hole opening 283 formed therethrough from the first surface 281 to the second surface 282 thereof. The key-hole opening 283 has a peripheral shape defined by a peripheral surface 284 connecting the first surface 281 to the second surface 282 with the peripheral surface 284 arranged perpendicular to the first and second surfaces 281, 282. The peripheral surface 284 intersects the first surface 281 about a peripherally extending edge 285. The key-hole opening 283 has a shape including a first portion 286 and a slot 287 extending from the first portion 286, wherein the slot 287 has a smaller width/diameter than the first portion 286. In the present embodiment, the first portion 286 is substantially circular in shape and the slot 287 extends radially outwardly away from a center of the circular shape of the first portion 286. The peripheral surface 284 merges the first portion 286 and the slot 287 smoothly and arcuately to form a mouth 289 into the slot 287. The key-hole opening 283 extends longitudinally in a direction parallel to the longitudinal direction of the opening 273 formed in the rear plate 270. As best shown in FIG. 17, the circular shaped first portion 286 of the key-hole opening 283 is aligned with a first one of the semi-circular ends of the opening 273 while the slot 287 is aligned with and extends over a second one of the semi-circular ends of the opening 273. The portion of the front plate 280 surrounding the edge 285 and extending over the end surface 274 of the rear plate 270 forms the hooded portion 240 of the female component 214 while the slot 287 forms the slotted portion of the female component 214. A pocket of the female component 214 is formed by those portions of the opening 273 present between the end surface 274 of the rear plate 270 and the hooded portion 240 of the front plate 280.

The front plate 280 further includes a pair of coupling openings 255 formed therein with each of the coupling openings 255 configured to receive a strap or the like in similar fashion to the coupling openings 155 of the magnetic fastener 110. The coupling openings 255 are formed in portions of the front plate 280 disposed laterally and out of alignment with the rear plate 270.

In the present embodiment, the front plate 280, and more specifically the hooded portion 240 of the front plate 280, forms the magnetically attractive portion of the female component 214 configured for being magnetically coupled to the magnet 216 of the male component 212. However, the entirety of the front plate 280 of the female component 214 may be formed from a single continuous and monolithically formed extension of the magnetically attractive material as is best illustrated in FIG. 17 without altering the method of operation of the magnetic fastener 210. However, the front plate 280 of the female component 214 may alternatively be formed from multiple different portions or segments coupled to each other so long as the portion of the hooded portion 240 of the front plate 280 partially forming the pocket of the female component 214 is formed from the magnetically attractive material.

The front plate 280 may also include a projection 292 extending from the first surface 281 thereof in a direction perpendicular thereto with the projection 292 disposed adjacent an end of the slot 287. The projection 292 forms a ledge arranged on a plane perpendicular to the direction of extension of the slot 287 from the first portion 286 of the key-hole opening 283.

In order to provide the mechanical coupling of the male component 212 to the female component 214 during a positioning of the magnetic fastener 210 to the second position 222 thereof, the following relationships are established. The shaft formed by the fastener 230/sleeve 235 includes a first diameter and the insertion portion formed by the enlarged portion 260 includes a second diameter, wherein the second diameter is greater than the first diameter. Additionally, the slotted portion formed by the slot 287 includes a width from one side thereof to the opposing side thereof that is slightly greater than the first diameter and smaller than the second diameter, wherein the width is measured in a direction perpendicular to the longitudinal direction of extension of the slot 287. Accordingly, the shaft is able to be slidably received within the slotted portion while the insertion portion cannot pass axially through the slotted portion when the shaft is slidably received within the slotted portion. If non-cylindrical components are utilized for forming the shaft and the insertion portion, it should be understood that the first and second diameters may refer to the dimension of each of the components parallel to the width direction for establishing the desired relationships.

In use, the magnetic fastener 210 is repositioned from the first position 220 thereof to the second position 222 thereof as follows. First, the male component 212 is moved towards the base 238 of the female component 214 with the insertion portion thereof as formed by the enlarged portion 260 passing by the edge 285 of the hooded portion 240 with respect to the axial direction of the shaft as formed by the fastener 230. The insertion portion passes by the front plate 280 while axially inserted through the first portion 286 of the key-hole opening 283 and then into the opening 273 of the rear plate 270. The magnet 216 then magnetically engages the magnetically attractive material forming the hooded portion 240 of the front plate 280 to substantially affix an axial position of the male component 212 relative to the female component 214. As mentioned above, the magnetic attraction between the magnet 216 and the magnetically attractive portion of the hooded portion 240 is strongest in the axial direction of the shaft to allow for the magnet 216 to be slid towards the slot 287 of the key-hole opening 283 despite the magnetic attraction between the magnet 216 and the hooded portion 240. The insertion portion is accordingly moved in the direction perpendicular to the axial direction of the shaft into the slot 287 with the insertion portion entering the pocket formed between the base 238 and the hooded portion 240. When the shaft is fully received within the slot 287, an outer circumferential surface of the insertion portion as formed by the enlarged portion 260 is configured to engage the peripheral wall 241 as formed by the peripheral surface 275 of the opening 273. Additionally, an outer circumferential surface of the magnet 216/cover assembly 203 may bear against the ledge of the projection 292 when the shaft is fully received within the slot 287 to relieve some of the stress otherwise applied to the shaft within the slot 287.

The slot 287 accordingly prevents lateral movement of the male component 212 relative to the longitudinal direction of the slot 287 while the end of the slot 287 as well as the peripheral wall 241 prevents further movement of the male component 212 in the longitudinal direction of the slot 287 towards the projection 292. The magnet 216 also maintains the magnetic connection to the magnetically attractive portion of the hooded portion 240 while the insertion portion is maintained within the pocket. The hooded portion 240 and the base 238 further prevent any undesired motion of the insertion portion in the axial direction of the shaft.

The magnetic fastener 210 may then be repositioned from the second position 222 back to the first position 220 by moving the male component 212 in the longitudinal direction of the slot 287 away from the end of the slot 287 until the insertion portion is clear of the hooded portion 240 and aligned with the first portion 286 of the key-hole opening 283. The male component 212 can then be disengaged from the female component 214 by pulling the male component 212 away from the female component 214 in the axial direction of the shaft against the magnetic attraction present between the hooded portion 240 and the magnet 216.

Referring now to FIGS. 20-22, a magnetic fastener 310 according to yet another embodiment of the invention is disclosed. The magnetic fastener 310 includes a male component 312 and a female component 314. The male component 312 is generally T-shaped in configuration and includes a substantially planar central tab 330 and a substantially cylindrical rod 340 disposed at an end of the central tab 330 and arranged perpendicular thereto. A plane defined by the central tab 330 extends through a center of the rod 340. The rod 340 includes a first end portion 341 extending beyond the central tab 330 to a first side thereof and a second end portion 342 extending beyond the central tab 330 to a second side thereof. The rod 340 accordingly includes a longitudinal length that is greater than a width of the central tab 330. The central tab 330 and the rod 340 may be formed monolithically or may be coupled to each other via a suitable coupling method.

As best shown in FIG. 22, the rod 340 may be formed from a central portion 343, a first end cap 344, and an opposing second end cap 345. A first magnet 346 is disposed between the central portion 343 and the first end cap 344 and a second magnet 347 is disposed between the central portion 343 and the second end cap 345. The end caps 344, 345 accordingly cooperate with the central portion 343 to encapsulate the magnets 346, 347 within the rod 340 at desired positions with respect to the longitudinal direction of the rod 340. However, the rod 340 may be formed using any assembly of components for disposing the first magnet 346 at a desired position within the first end portion 341 and the second magnet 347 at a desired position within the second end portion 342. The magnets 346, 347 may be provided as permanent magnets having configurations and polarities suitable for magnetically coupling the male component 312 to the female component 314. Specifically, each of the magnets 346, 347 may include polarities for attracting a corresponding magnetic component disposed below the magnets 346, 347 from the perspective of FIGS. 20-22 in a direction of extension of the central tab 330. Each of the magnets 346, 347 may include any corresponding cross-sectional shape and configuration for achieving the desired polarity and magnetic attractiveness thereof. The end caps 344, 345 may be provided from a non-magnetic material, as desired, but any material may be utilized. In some embodiments, the end caps 344, 345 may be formed from a resin or the like molded around the magnets 346, 347 within corresponding openings formed in each of the end portions 341, 342. The remainder of the male component 312 may be formed from any material including a ferrous and magnetically attractive material, as desired, without departing from the scope of the present invention.

The central tab 330 includes a coupling opening 335 formed therein at a position spaced from the merging of the rod 340 with the central tab 330. The coupling opening 335 is configured to couple the male component 312 to a separate component such as a strap or the like.

The female component 314 is substantially J-shaped in profile and includes a substantially planar back plate 350, a semi-circular first hook portion 361, and a semi-circular second hook portion 362. The hook portions 361, 362 extend from an end of the back plate 350 and are spaced apart from each other at the end of the back plate 350 to form an opening 363 therebetween. The opening 363 includes a width slightly greater than the width of the central tab 330.

The hook portions 361, 362 are formed from a magnetically attractive material configured to be magnetically attracted to the magnets 346, 347 of the rod 340. Due to the monolithic formation of the hook portions 361, 362 with the remainder of the back plate 350, the entirety of the female component 314 may be formed from the magnetically attractive material.

The back plate 350 includes a pair of coupling openings 355 formed therein having a similar configuration to the coupling openings 155, 255 of the magnetic fasteners 110, 210. Each of the coupling openings 355 is configured to receive a strap or the like therein for forming a halter assembly or the like.

Although the magnetic fastener 310 is substantially different in configuration, the magnetic fastener 310 operates in similar fashion to the previously disclosed magnetic fasteners 10, 62, 110, 210. The rod 340 forms an insertion portion of the male component 312 while the central tab 330 extending away from the rod 340 forms a shaft of the male component 312. The back plate 350 and the adjoining portion of each of the hook portions 361, 362 form a base of the female component 314 while the opposing distally spaced portions of each of the hook portions 361, 362 form a hooded portion of the female component 314. A portion of each of the hook portions 361, 362 arranged perpendicular to the back plate 350 connects the previously described hooded portion to the base and accordingly forms a peripheral wall. A pocket of the female component 314 is therefore formed between the opposing portions of the hook portions 361, 362 that is configured for reception of the insertion portion of the male component 312. Similarly, the opening 363 formed between the hook portions 361, 362 forms a slotted portion of the female component configured to receive the shaft of the male component 312 as formed by the central tab 330.

In use, the male component 312 is coupled to the female component 314 by placing the first and second end portions 341, 342 of the rod 340 of the male component 312 within the first and second hook portions 361, 362 of the female component 314 with the central tab 330 received within the opening 363. In similar fashion to the previously disclosed magnetic fasteners 10, 62, 110, 210, the configuration of the magnetic fastener 310 prevents translation of the male component 312 in any direction other than a direction of removal of the central tab 330 from the opening 363 while the magnetic attraction between the magnets 346, 347 and the magnetically attractable hook portions 361, 362 aids in locating the male component 312 relative to the female component 314.

Figure 23:
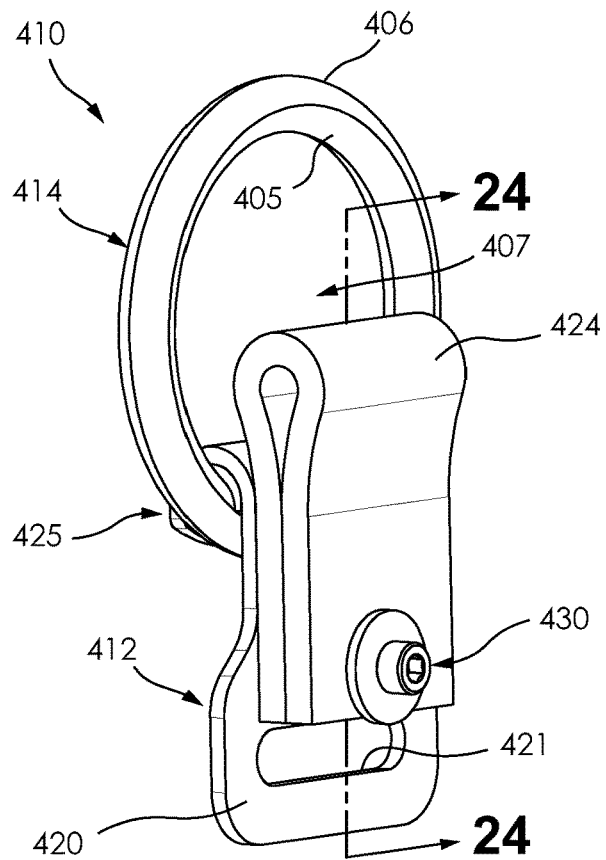
FIG. 23 is a front perspective view of a magnetic fastener according to another embodiment of the invention.
Figure 24:
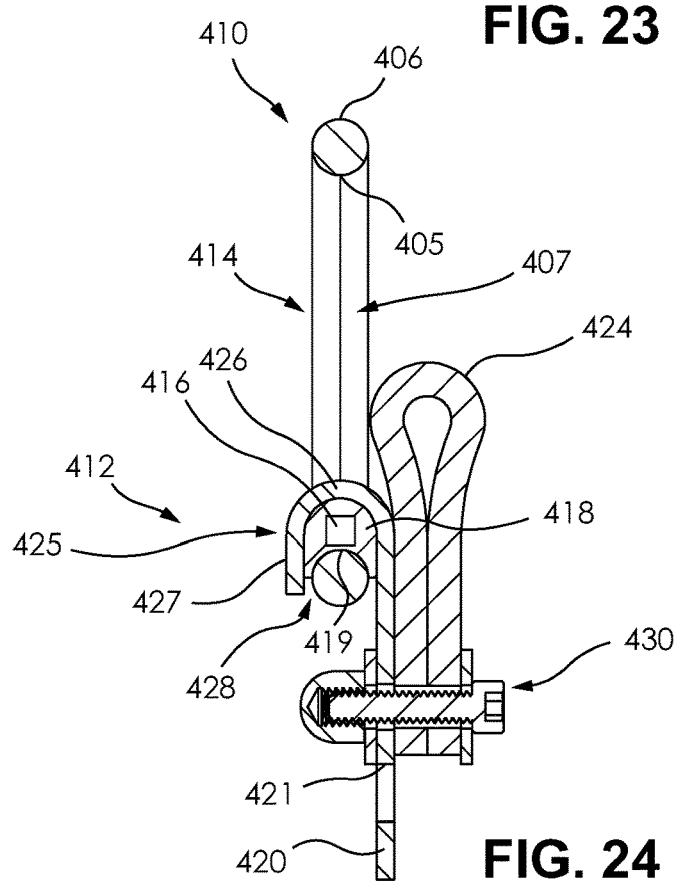
FIG. 24 is cross-sectional side elevational view of the magnetic fastener as taken from the perspective of section lines 24-24 in FIG. 23.

Referring now to FIGS. 23 and 24, a magnetic fastener 410 according to a final embodiment of the invention is disclosed. The magnetic fastener 410 generally includes a hook structure 412 and a ring structure 414.

The ring structure 414 may include a substantially circular-cross-sectional shape extending annularly around a circumference of the ring structure 414. The ring structure 414 includes an inner circumferential surface 405 having a semi-circular profile shape around the inner circumference of the ring structure 414 and an opposing outer circumferential surface 406 having an opposing semi-circular shape around the outer circumference of the ring structure 414. The inner circumferential surface 405 defines a central opening 407 through the ring structure 414. The ring structure 414 may be formed from a magnetically attractive material such as those described above in reference to the magnetic fastener 110. The ring structure 414 allows for various coupling mechanisms such as loops, ties, hooks, or the like to extend around the ring structure 414 for attaching straps or the like to the ring structure 414.

The hook structure 412 is substantially J-shaped in configuration and includes a plate portion 420 and a hook portion 425 extending from an end of the plate portion 420. The plate portion 420 is substantially planar in configuration and includes a coupling opening 421 formed therein adjacent an end of the plate portion 420 opposite the hooked portion 425. A strap 424 is coupled to the plate portion 420 via a fastener 430 at a position intermediate the coupling opening 421 and the hook portion 425. The strap 424 is shown as being cut off at positions below the fastener 430 in FIGS. 23 and 24 to better show the remaining components of the magnetic fastener 410, but the strap 424 may include any length from either of the portions thereof separated by a loop of the strap 424 and extending downwardly from the fastener 430 without departing from the scope of the present invention. The coupling opening 421 may be configured to receive a portion of the strap 424 therethrough or may be configured to receive an independently provided strap or the like (not shown), as desired. The fastener 430 extends through corresponding openings formed in each of the plate portion 420 and the strap 424. The fastener 430 is illustrated as a threaded bolt having an enlarged head at one end and a nut engaging the other end with interposed washers abutting each of the head and the nut, but any type of fastener may be utilized for securely coupling the strap 424 to the plate portion 420 without departing from the scope of the present invention.

The hook portion 425 includes a semi-circular segment 426 and a planar segment 427 extending from an end of the semi-circular segment 426 opposite the adjacent end of the plate portion 420 merging into the hook portion 425. The planar segment 427 is arranged parallel to the plate portion 420 and acts to elongate the hook portion 425 in the longitudinal direction of the plate portion 420. An opening 428 is defined through the hook structure 420 by the cooperation of the end of the plate portion 420, the semi-circular segment 426, and the planar segment 427 with the opening 428 having a substantially semi-stadium or semi-obround shape from the perspective of FIG. 24.

A magnet 416 is disposed within the opening 428 intermediate the adjacent end of the plate portion 420 and the planar segment 427 of the hook portion 425. In the illustrated embodiment, the magnet 416 is provided at a point from which a radius of curvature of the semi-circular segment 426 is defined, but alternative positioning of the magnet 416 may be utilized without departing from the scope of the present invention. The magnet 416 may extend exclusively in a width direction of the hook structure 412 (into the page with respect to FIG. 24), may be provided arcuately to match the curvature of the inner circumferential surface 405 of the ring structure 414, or may be provided as a plurality of magnet segments with each of the segments arranged substantially tangential to the adjacent portions of the ring structure 414, as desired. The magnet 416 or magnet segments may be provided to include a polarity generally tending to render the magnet 416 or magnet segments as magnetically attractive in a direction towards a center of the ring structure 414 when the magnetic fastener 410 is in the coupled position thereof as shown with respect to FIGS. 23 and 24.

In the provided embodiment, the magnet 416 is received within a magnet locating structure 418 disposed within the opening 428 of the hook structure 412. The magnet locating structure 418 may be formed in an overmolding process wherein the magnet 416 is placed in the desired position with the magnet locating structure 418 overmolded around the magnet 416. The magnet locating structure 418 may accordingly be formed from a moldable material such as an epoxy potting compound or the like, as desired, which is molded within the opening 428 to be generally complimentary in shape thereto. Alternatively, the magnet locating structure 418 may be formed from one or more structures coupled to the hook structure 412 within the opening 428 for affixing the position of the magnet 416. In either circumstance, the magnet locating structure 418 may be formed from a nonmetallic material and may include a thickness between the magnet 416 and the ring structure 414 when the magnetic fastener 410 is in the coupled position suitable for allowing the magnetic attraction of the magnet 416 to extend outside of the magnet locating structure 418 and attract the ring structure 414 thereto.

The magnet locating structure 418 includes an outwardly facing ring receiving surface 419 that may be substantially complimentary in shape to the inner circumferential surface 405 of the ring structure 414 about a portion thereof formed to one diametric side of the central opening 407 formed through the ring structure 414. The ring receiving surface 419 may include a semi-circular cross-sectional shape extending about a circumferential direction of the inner circumferential surface 405 of the ring structure 414 for engaging at least a circumferentially extending portion of the inner circumferential surface 405 of the ring structure 414 when the magnetic fastener 410 is in the coupled position shown in FIGS. 23 and 24. However, the ring receiving surface 419 may include any grooved shape or may extend circumferentially with any curvature suitable for receiving the inner circumferential surface 405 of the ring structure 414 therein in a manner preventing undesired removal of the hook structure 412 from the ring structure 414.

In use, the hook portion 425 of the hook structure 412 is received through the central opening 407 of the ring structure 414 as defined by the inner circumferential surface 405 thereof until the magnet 416 is disposed on the plane generally defined by the ring structure 414 with the planar segment 427 of the hook portion 425 having passed by the ring structure 414. The hook portion 425 is then moved in a radial outward direction of the ring structure 414 until the inner circumferential surface 405 of the ring structure 414 is received within the ring receiving surface 419 of the magnet locating structure 418 to mechanically couple the hook structure 412 to the ring structure 414. The magnetic attraction present between the magnet 416 and the ring structure 414 aids in drawing the hook portion 425 towards the ring structure 414 and then aids in maintaining the coupled position of the magnetic fastener 410. The hook structure 412 may then be uncoupled from the ring structure 414 by moving the hook structure 412 in the radial inward direction of the ring structure 414 to disengage the magnetic and mechanical connection formed therebetween before removing the hook portion 425 from the central opening 407.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A magnetic fastener comprising:
   a female component including a base, a hooded portion spaced from the base and formed opposite thereto, and a peripheral wall connecting the base to the hooded portion, a pocket formed between the base and the hooded portion, the hooded portion including a slot formed therein, wherein a portion of the female component is magnetically attractive; and a male component including an insertion portion and a shaft extending from the insertion portion, wherein a portion of the male component is formed by a magnet, wherein the male component is configured to be coupled to the female component when the magnet is magnetically coupled to the portion of the female component that is magnetically attractive, the insertion portion is received within the pocket, and the shaft is received within the slot, wherein the slot is configured to allow for a sliding of the shaft along only a single axis arranged perpendicular to an axial direction of the shaft among all axes arranged perpendicular to the axial direction of the shaft when the insertion portion is received within the pocket.

2. The magnetic fastener of claim 1, wherein the insertion portion of the male component forms the magnet of the male component.

3. The magnetic fastener of claim 2, wherein the portion of the female component that is magnetically attractive is the base thereof.

4. The magnetic fastener of claim 1, wherein at least a portion of the shaft extends between the magnet and the insertion portion, and wherein the magnet is spaced from the insertion portion with respect to the axial direction of the shaft.

5. The magnetic fastener of claim 4, wherein the portion of the female component that is magnetically attractive is the hooded portion thereof.

6. The magnetic fastener of claim 1, wherein the slot extends from an edge of the hooded portion of the female component.

7. The magnetic fastener of claim 6, wherein the insertion portion passes by the edge of the hooded portion with respect to the axial direction of the shaft prior to the insertion portion being received within the pocket.

8. The magnetic fastener of claim 6, wherein the edge is formed by an end of the hooded portion spaced a maximum distance from the peripheral wall.

9. The magnetic fastener of claim 6, wherein the edge is formed by an opening extending through the hooded portion with the slot intersecting the opening.

10. The magnetic fastener of claim 9, wherein the opening has a perimeter shape substantially corresponding to a perimeter shape of the insertion portion.

11. The magnetic fastener of claim 1, wherein the portion of the female component that is magnetically attractive is formed from a ferrous material.

12. The magnetic fastener of claim 1, wherein the shaft and the insertion portion are each cylindrical in shape.

13. The magnetic fastener of claim 1, wherein the shaft has a first diameter and the insertion portion has a second diameter, wherein the second diameter is larger than the first diameter.

14. The magnetic fastener of claim 13, wherein the slot includes a width that is greater than the first diameter and less than the second diameter.

15. The magnetic fastener of claim 1, wherein a coupling of the male component to the female component includes the insertion portion moving by the hooded portion with respect to the axial direction of the shaft followed by the shaft moving into the slot along the single axis arranged perpendicular to the axial direction of the shaft.

16. The magnetic fastener of claim 1, wherein the slot extends longitudinally into the hooded portion in a direction perpendicular to a direction the hooded portion is spaced from the base.

17. The magnetic fastener of claim 1, wherein the hooded portion forms a stopping surface configured to engage the insertion portion when the insertion portion is received within the pocket and the shaft is received within the slot, and the insertion portion is moved with respect to the axial direction of the shaft towards the hooded portion.

* * * * *